United States Patent
Saishu et al.

(10) Patent No.: US 8,384,772 B2
(45) Date of Patent: Feb. 26, 2013

(54) THREE-DIMENSIONAL IMAGE DISPLAY DEVICE AND THREE-DIMENSIONAL IMAGE DISPLAY METHOD

(75) Inventors: Tatsuo Saishu, Tokyo (JP); Rieko Fukushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 846 days.

(21) Appl. No.: 11/887,917

(22) PCT Filed: Aug. 31, 2007

(86) PCT No.: PCT/JP2007/067543
§ 371 (c)(1),
(2), (4) Date: Sep. 30, 2009

(87) PCT Pub. No.: WO2008/029930
PCT Pub. Date: Mar. 13, 2008

(65) Prior Publication Data
US 2009/0309873 A1 Dec. 17, 2009

(30) Foreign Application Priority Data
Sep. 7, 2006 (JP) ................. 2006-243255

(51) Int. Cl.
*H04N 13/04* (2006.01)
*H04N 9/47* (2006.01)
(52) U.S. Cl. .......................... 348/59; 348/60
(58) Field of Classification Search .................... 348/59, 348/60
See application file for complete search history.

(56) References Cited

U.S. PATENT DOCUMENTS
7,002,749 B2 * 2/2006 Kremen .................... 359/619
(Continued)

FOREIGN PATENT DOCUMENTS
EP 1 796 401 A1 6/2007
JP 2004-258210 9/2004
(Continued)

OTHER PUBLICATIONS

International Search Report issued by the European Patent Office on Jan. 22, 2008, for International Application No. PCT/JP2007/067543.

(Continued)

*Primary Examiner* — Hieu Hoang
(74) *Attorney, Agent, or Firm* — Finnegan, Henderson, Farabow, Garrett & Dunner, L.L.P.

(57) ABSTRACT

It is made possible to provide a three-dimensional image display device by which an alarm image with high visibility can be displayed at the end of the viewing zone in a parallel-ray one-dimensional IP system, without a reduction of the viewing zone or a decrease in processing speed. A three-dimensional image display device includes: an elemental image display unit that has pixels arranged in a matrix form in a display plane, and displays elemental images; an optical plate that is placed to face the elemental image display unit, has optical apertures that extend linearly in a vertical direction and are arranged at regular intervals in a horizontal direction, and controls light rays from the elemental image display unit; and an image data converting unit that converts image data so that single-color portions having periodically varying widths are inserted to boundary portions between the elemental images, the width varying with locations in the elemental image display unit, the inserted single-color portions being asymmetrical in the entire elemental image display unit.

12 Claims, 19 Drawing Sheets

U.S. PATENT DOCUMENTS

| | | | |
|---|---|---|---|
| 7,091,992 B2 * | 8/2006 | Lee et al. | 345/629 |
| 7,136,031 B2 * | 11/2006 | Lee et al. | 345/32 |
| 7,281,802 B2 * | 10/2007 | Saishu et al. | 353/7 |
| 7,425,951 B2 * | 9/2008 | Fukushima et al. | 345/419 |
| 7,643,552 B2 * | 1/2010 | Saishu et al. | 375/240.01 |
| 7,742,046 B2 * | 6/2010 | Fukushima et al. | 345/419 |
| 7,786,953 B2 * | 8/2010 | Saishu | 345/4 |
| 7,787,008 B2 * | 8/2010 | Fukushima et al. | 348/51 |
| 8,040,370 B2 * | 10/2011 | Saishu | 348/51 |
| 2003/0052876 A1 * | 3/2003 | Lee et al. | 345/419 |
| 2004/0061934 A1 * | 4/2004 | Lee et al. | 359/443 |
| 2004/0150583 A1 * | 8/2004 | Fukushima et al. | 345/6 |
| 2005/0105179 A1 * | 5/2005 | Taira et al. | 359/463 |
| 2005/0259323 A1 * | 11/2005 | Fukushima et al. | 359/462 |
| 2005/0264651 A1 * | 12/2005 | Saishu et al. | 348/51 |
| 2005/0270366 A1 * | 12/2005 | Fukushima et al. | 348/42 |
| 2006/0215018 A1 * | 9/2006 | Fukushima et al. | 348/51 |
| 2006/0238863 A1 * | 10/2006 | Saishu | 359/472 |
| 2007/0052729 A1 * | 3/2007 | Fukushima et al. | 345/629 |
| 2007/0109620 A1 | 5/2007 | Saishu et al. | |
| 2008/0252971 A1 * | 10/2008 | Lee et al. | 359/463 |
| 2009/0102916 A1 | 4/2009 | Saishu et al. | |

FOREIGN PATENT DOCUMENTS

JP      2006-098779      4/2006

OTHER PUBLICATIONS

International Preliminary Report on Patentability issued on Dec. 4, 2008, by the European Patent Office for International Patent Application No. PCT/JP2007/067543.

Saishu et al.; "53.3 Distortion Control in a One-Dimensional Integral Imaging Autostereoscopic Display System With Parallel Optical Beam Groups"; Society for Information Display Symposium, Digest of Technical Papers, p. 1438-1441, (May 2004).

Levoy et al.; "Light Field Rendering"; ACM SIGGRAPH, pp. 31-42, (1996).

Yamamoto et al; "Elimination of Pseudoscopic Viewing Area of Steroscopic Full-Color LED Display Using Parallax Barrier"; International Display Workshop, pp. 1249-1252, (2002).

Saishu, U.S. Appl. No. 11/911,460, filed Oct. 12, 2007.

* cited by examiner

FIG.12 (a)
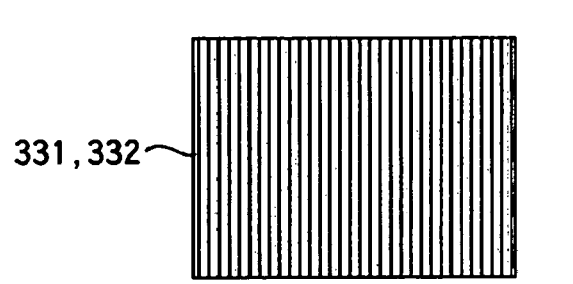
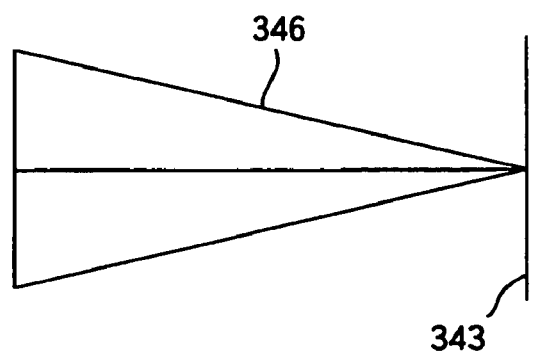
FIG.12 (c)
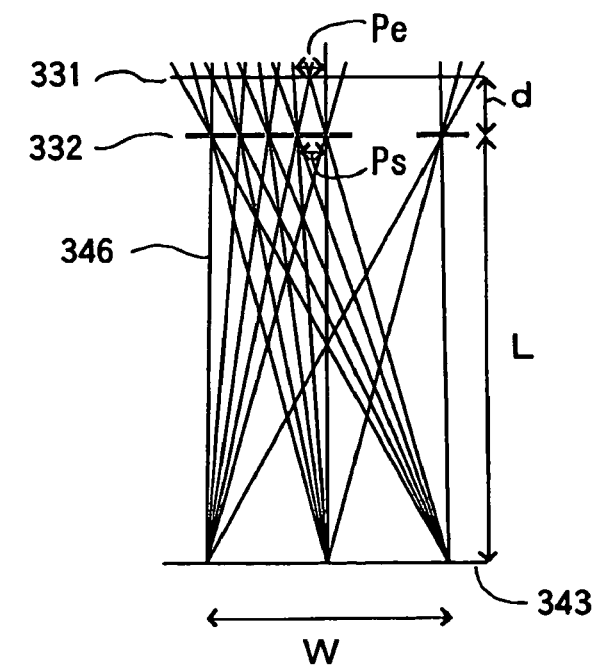
FIG.12 (b)

| PARALLAX NUMBER | 3-D PIXEL NUMBER | | ZONE WIDTH | LCD SUB-PIXEL NUMBER | |
|---|---|---|---|---|---|
| | START (LEFT END) | FINISH (RIGHT END) | | START (LEFT END) | FINISH (RIGHT END) |
| -15 | 2 | 8 | 7 | 13 | 121 |
| -14 | 2 | 36 | 35 | 14 | 626 |
| -13 | 2 | 63 | 62 | 15 | 1113 |
| -12 | 2 | 91 | 90 | 16 | 1618 |
| -11 | 2 | 119 | 118 | 17 | 2123 |
| -10 | 2 | 147 | 146 | 18 | 2628 |
| -9 | 1 | 174 | 174 | 1 | 3115 |
| -8 | 1 | 202 | 202 | 2 | 3620 |
| -7 | 1 | 230 | 230 | 3 | 4125 |
| -6 | 1 | 258 | 258 | 4 | 4630 |
| -5 | 1 | 285 | 285 | 5 | 5117 |
| -4 | 1 | 313 | 313 | 6 | 5622 |
| -3 | 1 | 320 | 320 | 7 | 5749 |
| -2 | 1 | 320 | 320 | 8 | 5750 |
| -1 | 1 | 320 | 320 | 9 | 5751 |
| 1 | 1 | 320 | 320 | 10 | 5752 |
| 2 | 1 | 320 | 320 | 11 | 5753 |
| 3 | 1 | 320 | 320 | 12 | 5754 |
| 4 | 8 | 320 | 313 | 139 | 5755 |
| 5 | 36 | 320 | 285 | 644 | 5756 |
| 6 | 63 | 320 | 258 | 1131 | 5757 |
| 7 | 91 | 320 | 230 | 1636 | 5758 |
| 8 | 119 | 320 | 202 | 2141 | 5759 |
| 9 | 147 | 320 | 174 | 2646 | 5760 |
| 10 | 174 | 319 | 146 | 3133 | 5743 |
| 11 | 202 | 319 | 118 | 3638 | 5744 |
| 12 | 230 | 319 | 90 | 4143 | 5745 |
| 13 | 258 | 319 | 62 | 4648 | 5746 |
| 14 | 285 | 319 | 35 | 5135 | 5747 |
| 15 | 313 | 319 | 7 | 5640 | 5748 |

THREE-DIMENSIONAL IMAGE DISPLAY DEVICE AND THREE-DIMENSIONAL IMAGE DISPLAY METHOD

BACKGROUND OF THE INVENTION

1. Field of the Invention

The present invention relates to a three-dimensional image display device and a three-dimensional image display method.

2. Related Art

There are various known systems for stereoscopic image display devices or so-called three-dimensional display devices that can display moving images. In recent years, there is an increasing demand for flat-panel type devices that do not require any special tools such as glasses. One of the systems that can be easily realized is a system in which an optical plate for directing the light rays from a display panel (an elemental image display unit) toward a viewer is placed in front of the display panel of a device such as a liquid crystal display device or a plasma display device of a direct-vision type or a projection type having the pixel positions fixed therein.

An optical plate is generally called a parallax barrier, and controls light rays so that different images can be seen from the same position on the optical plate at different angles. More specifically, in a case where only transverse parallaxes (horizontal parallaxes) are provided, slits or a lenticular sheet (a cylindrical lens array) is employed. In a case where vertical parallaxes are also provided, a pinhole array or a lens array is employed. The systems utilizing parallax barriers include the binocular system, the multi-viewpoint system, the super multi-viewpoint system (the multi-viewpoint system involving a very large number of viewpoints), and the integral photography (hereinafter referred to as IP). The basic principles of those systems are substantially the same as those developed a hundred years ago and used for stereoscopic photography.

In the IP system or the multi-viewpoint system, the viewing distance is normally limited, and therefore, an image to be displayed is formed so that the perspective projection image at the viewing distance can be actually seen. In the IP system provided only with horizontal parallaxes (the one-dimensional IP system), there are combinations of parallel light rays where the horizontal pitch of the parallax barrier is equivalent to an integral multiple of the value of the horizontal pitch of sub-pixels of the elemental image display unit (this system will be hereinafter referred to also as the parallel-ray one-dimensional IP). Therefore, images that are perspective projection images at a constant viewing distance in the vertical direction and are orthographic projection images in the horizontal direction are divided into the images of the respective pixel columns, and the divided images are combined to form a parallax interleaved image in the image format to be displayed in the display plane. In this manner, a correctly projected three-dimensional image can be obtained. The specific procedures are disclosed in SID04 Digest 1438 (2004). In the multi-viewpoint system, an image formed through a simple perspective projection is divided and rearranged, so as to obtain a correctly projected three-dimensional image.

An image pick-up device that utilizes different projecting methods and different projection center distances between the vertical direction and the horizontal direction is difficult to produce, because cameras or lenses of the same size as the object to be displayed are required, especially in a orthographic projecting operation. Therefore, to achieve orthographic projection data through an image pick-up operation, conversion of the image pick-up data of a perspective projection image is more realistic. For example, a light-ray space method or the like by which interpolations utilizing an EPI (epipolar plane) are performed is well known.

As disclosed in SID04 Digest 1438 (2004), the parallel-ray one-dimensional IP system has a wider viewing zone and more continuous motion parallaxes than the binocular system and the multi-viewpoint system. Accordingly, in the parallel-ray one-dimensional IP system, images can be easily viewed, without a feeling of discomfort.

Since the binocular system and the multi-viewpoint system are the simplest three-dimensional image display systems, the image formats are also simple, and all viewpoint images have the same sizes. Two parallax components images in a binocular case and nine parallax components images in a nine-viewpoint case are divided into images of the respective pixel columns, and the divided images are combined to form a parallax interleaved image (elemental image array) in the image format to be displayed on the elemental image display unit. In the parallel-ray one-dimensional IP system, the number of parallax component images is larger than that in a multi-viewpoint system having the same resolution, and the sizes (the horizontal use ranges) of the parallax components images vary with the parallax directions. However, JP-A 2006-98779 (KOKAI) discloses that, in the parallel-ray one-dimensional IP system, tiling can be efficiently performed on the parallax component images in suitable combinations only in the necessary ranges, and the parallax components images can be converted, with high efficiency, into a format that causes little degradation at the time of non-reversed compression.

In any of one-dimensional IP systems, two-dimensional IP systems, and multi-viewpoint systems involving many parallaxes, when a viewer is located on a viewing zone boundary, a pseudoscopic image or an abnormal (broken) image having several vertical lines running therein is observed. To prevent this, JP-A 2004-258210 (KOKAI) discloses a method by which alarm image data is arranged on the boundaries between elemental images, so that an alarm image, instead of a broken image, can be observed.

However, in a case where crosstalk between parallax components is utilized to provide continuous motion parallaxes, an alarm image placed on the boundary between elemental images might be recognized as a periodic pattern with only small gradations and is hardly visible. If the area of the alarm image is increased so as to be more easily recognized, the viewing zone for three-dimensional displays is narrowed. Also, since the process of inserting an alarm image to an image is not simple, the processing load is increased.

As described above, in a three-dimensional image display device of the conventional parallel-ray one-dimensional IP type, an alarm image placed on the boundary between elemental images is not easily recognized, and it is difficult to use an alarm image without a reduction of the viewing zone or a decrease in processing speed.

SUMMARY OF THE INVENTION

The present invention has been made in view of these circumstances, and an object thereof is to provide a three-dimensional image display device and a three-dimensional image display method by which an alarm image with high visibility can be displayed at the end of the viewing zone in a parallel-ray one-dimensional IP system, without a reduction of the viewing zone or a decrease in processing speed.

According to a first aspect of the present invention, there is provided a three-dimensional image display device comprising: an elemental image display unit that has pixels arranged in a matrix form in a display plane, and displays elemental images; an optical plate that is placed to face the elemental image display unit, has optical apertures that extend linearly in a vertical direction and are arranged at regular intervals in a horizontal direction, and controls light rays from the elemental image display unit; and an image data converting unit that converts image data so that single-color portions having periodically varying widths are inserted to boundary portions between the elemental images, the width varying with locations in the elemental image display unit, the inserted single-color portions being asymmetrical in the entire elemental image display unit.

According to a second aspect of the present invention, there is provided a three-dimensional image display method by which a three-dimensional image is displayed with the use of a three-dimensional image display device that includes: an elemental image display unit that has pixels arranged in a matrix fashion in a display plane, and displays elemental images; and an optical plate that is placed to face the elemental image display unit, has optical apertures that extend linearly in a vertical direction and are arranged at regular intervals in a horizontal direction, and controls light rays from the elemental image display unit, the method comprising converting image data so that single-color portions having periodically varying widths are inserted to boundary portions between the elemental images, the width varying with locations in the elemental image display unit, the inserted single-color portions being asymmetrical in the entire elemental image display unit.

BRIEF DESCRIPTION OF THE DRAWINGS

FIGS. 12(a), 12(b), and 12(c) are schematic views showing the relationships among the elemental image pitch, the parallax barrier pitch, the parallax barrier distance, the viewing distance, and the viewing zone;

FIG. 14 shows the data ranges of parallax component images and the locations of the parallax components images in a parallax interleaved image;

DETAILED DESCRIPTION OF THE INVENTION

The following is a description of a three-dimensional image display device in accordance with an embodiment of the present invention, with reference to the accompanying drawings.

Figure 1:
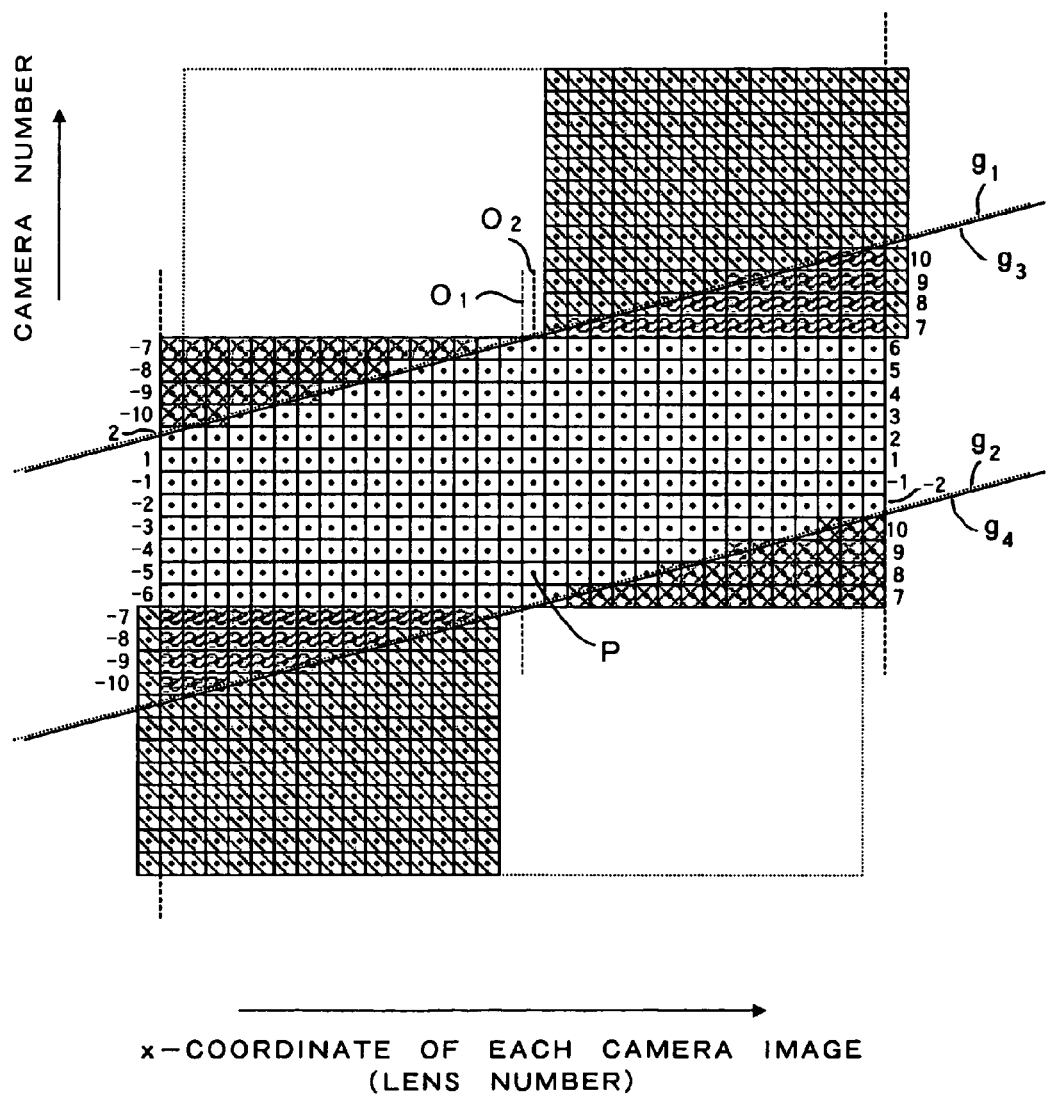
FIG. 1 is a schematic view showing a data space to be used in a three-dimensional image display device of a one-dimensional IP type according to an embodiment.

FIG. 1 is a conceptual diagram showing a data space for illustrating an image conversion method to be utilized in a three-dimensional image display device in accordance with an embodiment of the present invention. The data space shown in FIG. 1 is substantially equivalent to a generally-known light field or ray space (EPI). In FIG. 1, the abscissa axis indicates the x-coordinate of each camera image (the lens number (the number allotted to each elemental image)), and the ordinate axis indicates the camera number. The numbers shown on both sides in the ordinate direction are parallax numbers. Each one rectangle (having a dot in its center) P represents one-pixel data of a parallax component image (a camera image). One-pixel data P is shown as a data space only for one value on the vertical-direction coordinate (y-coordinate) of a camera image. More specifically, all the pixel data shown in FIG. 1 represent the camera images on the same y-coordinate. In FIG. 1, the parallax number is 12. In a parallel-ray one-dimensional IP system, a parallelogram defined by two diagonal lines $g_1$ and $g_2$ representing the viewing boundaries is used, the number of cameras is larger than 12, and the cameras have different x-coordinate ranges from one another.

Figure 2A:
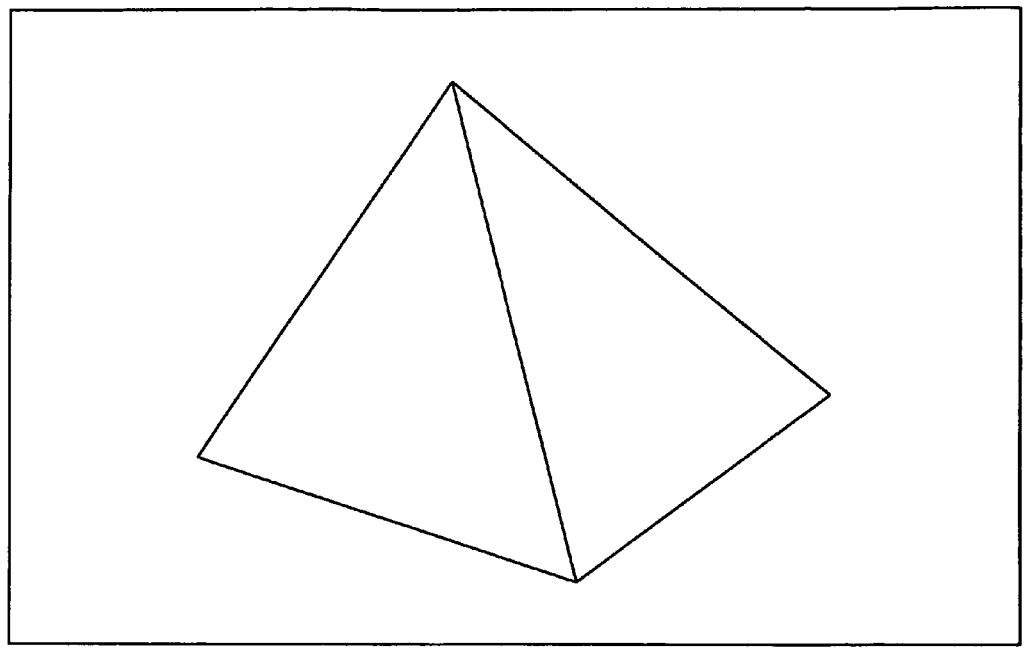
FIGS. 2A and 2B are conceptual diagrams showing three-dimensional images formed by a three-dimensional image display device according to an embodiment.
Figure 2B:
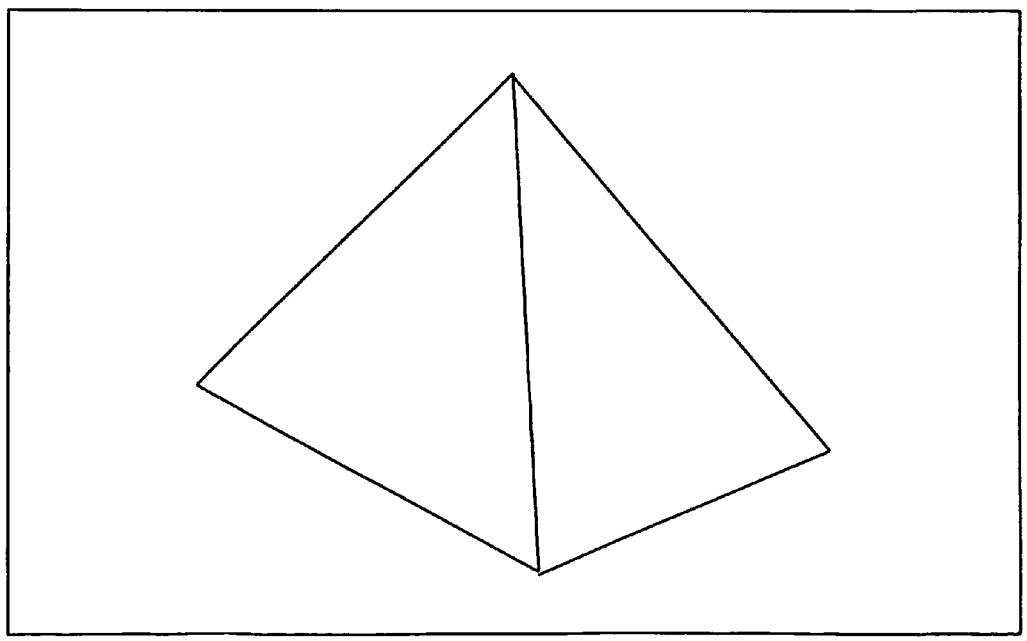
Figure 3:
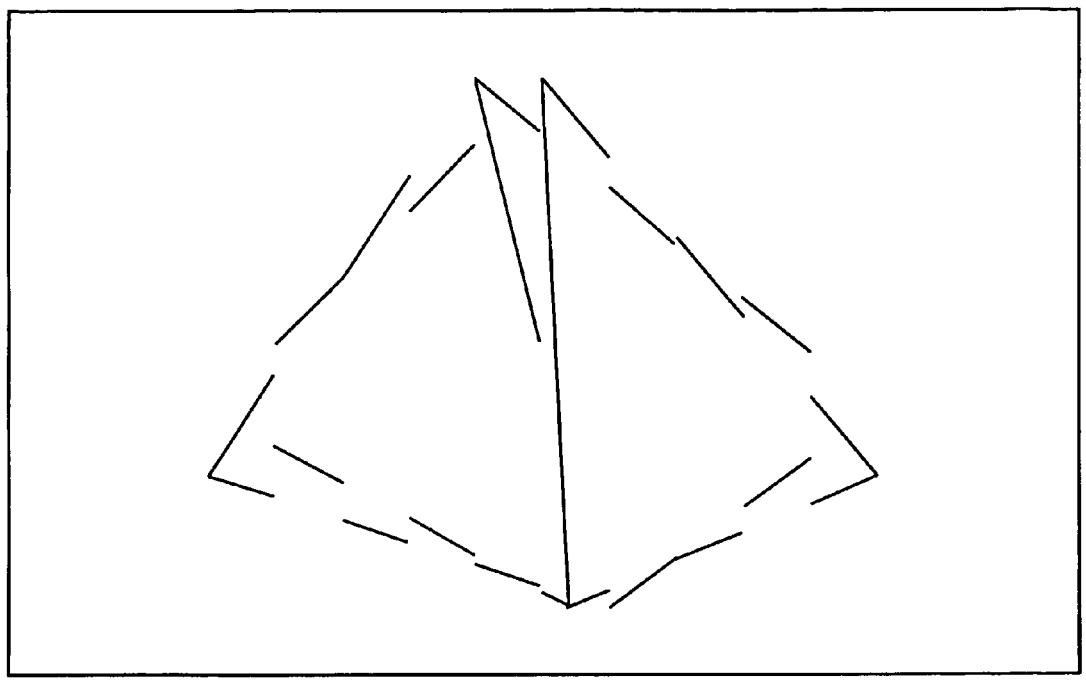
FIG. 3 is a conceptual diagram showing a broken image formed by a conventional three-dimensional image display device as a comparative example of the present invention.

Referring now to FIGS. 2A through 3, broken (pseudo-scopic) images are described. FIGS. 2A and 2B are conceptual diagrams of normal three-dimensional images, seen from the left end and the right end of a viewing zone. FIG. 3 shows an example of a broken image that is seen on a viewing boundary, where both images shown in FIGS. 2A and 2B are observed in a longitudinal region.

To prevent appearance of a broken image and display an alarm image instead, the pixel data in the vicinity of the diagonal lines $g_1$ and $g_2$ representing the viewing boundaries should be replaced with the data of an alarm image in the data space shown in FIG. 1. However, if one of the pixels closest to the diagonal lines shown by broken lines is selected for each x-coordinate and replaced with the alarm image data, the periodic pattern can be only seen as small gradations, and is very difficult to be visually recognized. Also, if the alarm image area is increased so as to increase the visibility, and two or more pixels are selected for each x-coordinate, the visibility does not change, and the viewing zone for three-dimensional displays becomes narrower.

Figure 4:
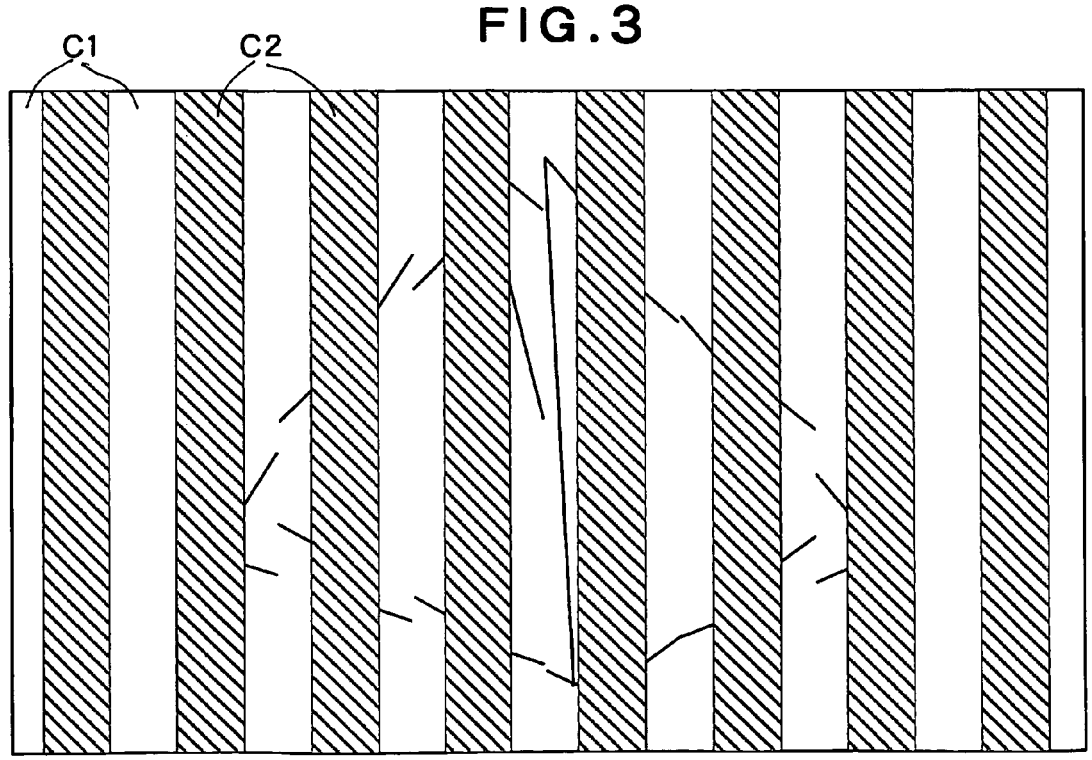
FIG. 4 is a conceptual view showing an example of an alarm image formed to prevent a broken image by a three-dimensional image display device of a one-dimensional IP type according to an embodiment.

To form an alarm image with high visibility, the pixels to be replaced with the alarm image need to be arranged not in a centrosymmetric fashion but in a pattern having a center $O_2$ as the reference that is a pixel next to the center $O_1$ of the data space. The reference lines in this case are shown as diagonal lines $g_3$ and $g_4$ extending along the diagonal lines $g_1$ and $g_2$ representing the viewing boundaries. Unless the use region in the data space is asymmetrical, the continuity in the alarm image is lost at the center of the screen. Further, a predetermined integral number of pixels closest to the reference lines $g_3$ and $g_4$ are not selected for each x-coordinate (each elemental image). Instead, the pixels located in an area of a non-integral number of pixels are selected, with the reference line with respect to each x-coordinate being the center. Accordingly, the numbers of selected pixels vary with the x-coordinates (elemental images), and the area in which the pixels located in the width equivalent to n (an integer) parallaxes are selected and the area in which the pixels located in the width equivalent to n+1 parallaxes are selected appear in cycles in accordance with the horizontal position of each elemental image in the display unit. In this manner, a dark and light pattern of spatial frequencies that can be easily recognized is formed. The non-integral number may be 0.75 or 1.25, but a value such as 0.5 or 1.5 (an integer+0.5) is more preferable, as the cycles in the dark and light pattern become uniform, and the optimum visibility can be obtained with such a non-integral number. FIG. 4 shows an alarm image that is seen in place of a broken image in a case where the pixels in the area of an integer+0.5 are selected and replaced with black-color data. The areas C1 in FIG. 4 are the areas that can be seen the same as in the case where the alarm image is not inserted, and the areas C2 are the areas that are viewed as black-colored areas.

Figure 5:
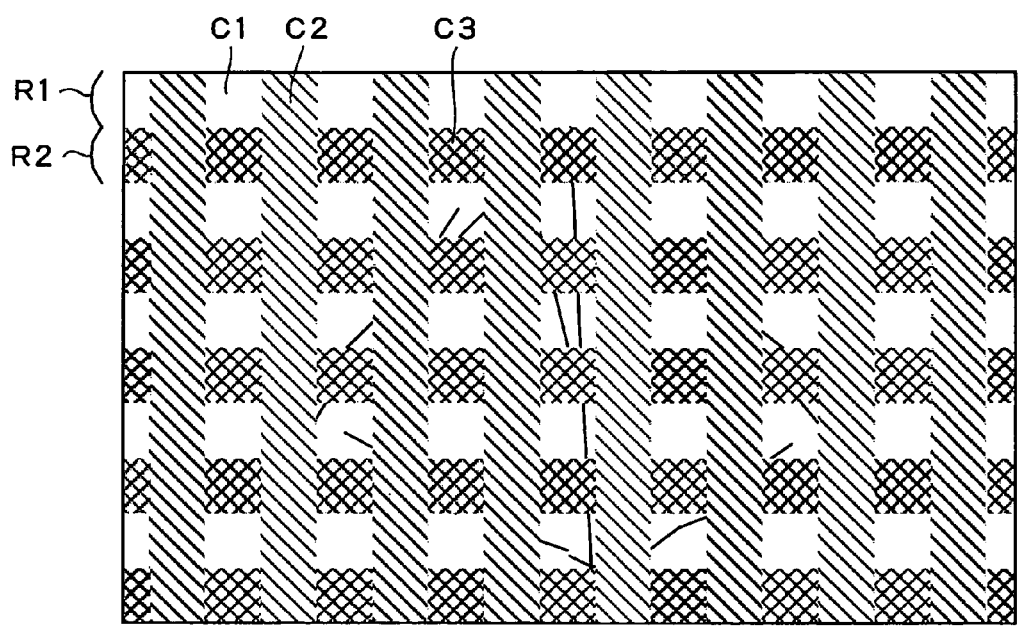
FIG. 5 is a conceptual view showing another example of an alarm image formed to prevent a broken image by a three-dimensional image display device according to an embodiment.

FIG. 5 shows an alarm image that can be seen in place of a broken image in a case where the non-integral number is switched between 0.5 and 1.5 every predetermined number of pixel rows. More specifically, in the pattern shown in FIG. 5, a first horizontal periodic pattern R1 (the non-integral number being 0.5) and a second horizontal periodic pattern R2 (the non-integral number being 1.5) alternately appear in the vertical direction of the display unit for elemental images. The areas C1 are areas that can be seen the same as in the case where the alarm image is not inserted, the areas C2 are the areas that are seen as black-colored areas, and the areas C3 are areas that are seen as areas in even darker black. In the pattern shown in FIG. 5, the pattern periodicities in the horizontal direction and the vertical direction are substantially the same. Though the pattern is slightly different from a checked pattern, the visibility is particularly high. As for the non-integral number, 0.5 or 1.5 is particularly preferable, since the portion of the viewing zone to be sacrificed for an alarm image is smaller as the non-integral number is smaller with respect to the number of parallaxes. Accordingly, a periodic pattern formed with widths each equivalent to zero parallax and widths each equivalent to one parallax, or a periodic pattern formed with widths each equivalent to one parallax and widths each equivalent to two parallaxes is formed. Even if the non-integral number is small, sufficiently high visibility can be achieved, and the non-integral number does not have to be large.

Figure 6:
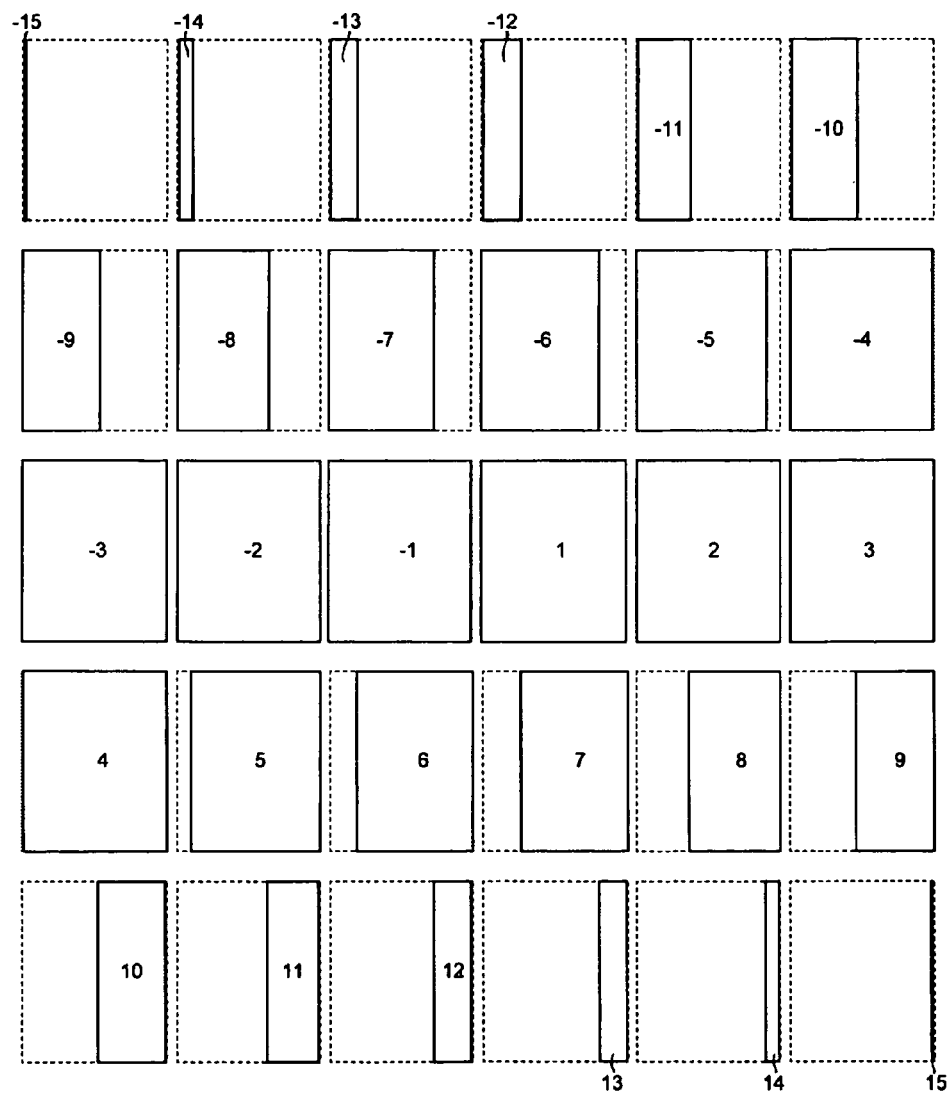
FIG. 6 shows each parallax component image to be used by a three-dimensional image display device according to an embodiment.
Figure 7:
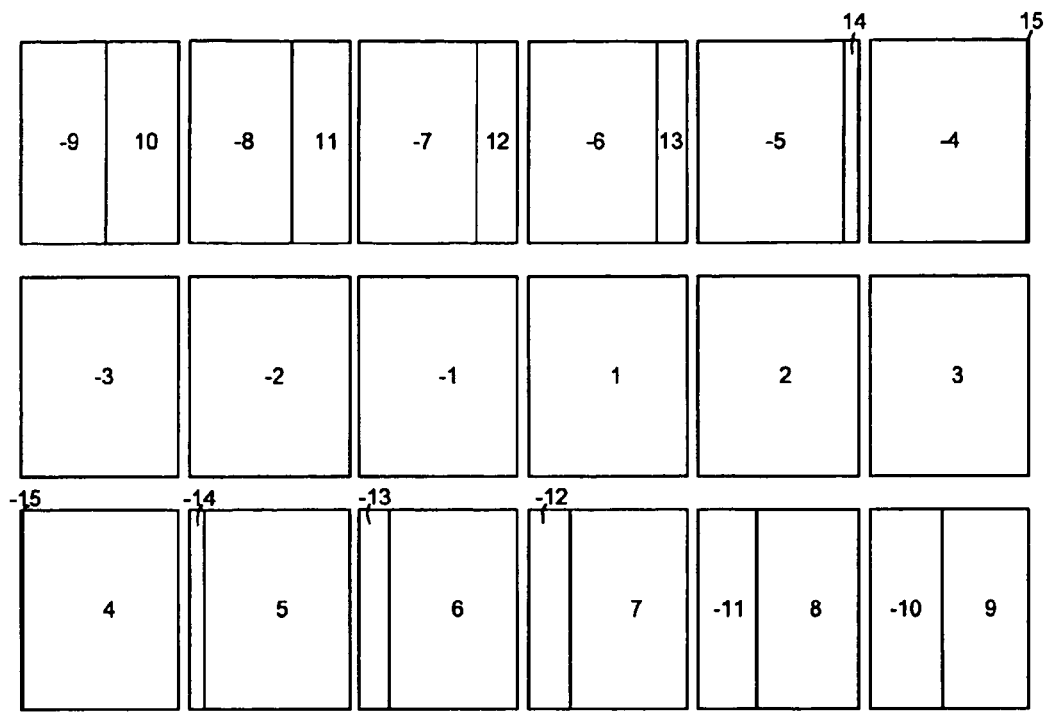
FIG. 7 shows a format to be used by a three-dimensional image display device according to an embodiment.
Figure 8:
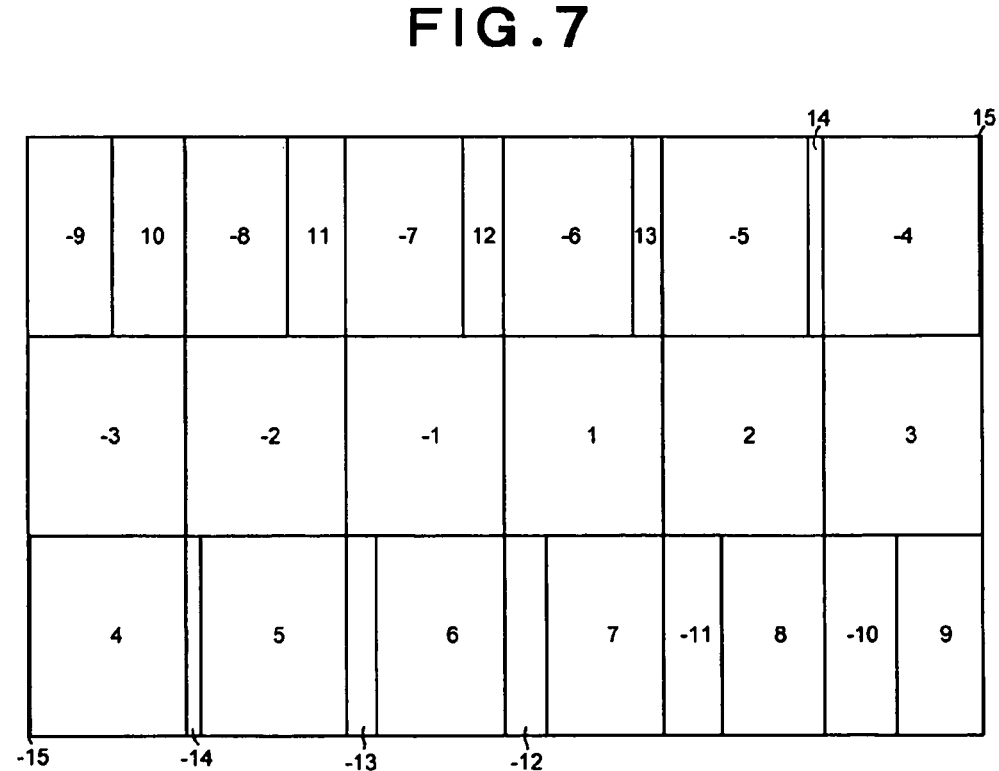
FIG. 8 shows a format of a collectively combined image to be used by a three-dimensional image display device according to an embodiment, where all the parallax component images are combined.

FIG. 6 shows examples of the shapes of the use ranges of parallax component images in a case where the number of parallaxes is 18 and the number of cameras is 30. The numbers shown in FIG. 6 are the parallax numbers corresponding to the respective parallax component images. Each region indicated by solid lines represents the data to be used for displaying a three-dimensional image of a parallax component image, and each region indicated by broken lines represents the data not to be used for displaying a three-dimensional image of a parallax component image. As in the example case shown in FIG. 1 where the number of parallaxes is 12, the cameras have different use ranges from one another. However, if the use ranges of each two images allotted with camera numbers different by the same value as the number of parallaxes are combined, eighteen images of the same size are obtained as shown in FIG. 7. For example, the use ranges of the images having each of the combinations of camera numbers (−9, 10), (−8, 11), (−7, 12), (−6, 13), (−5, 14), (−4, 15), (−15, 4), (−14, 5), (−13, 6), (−12, 7), (−11, 8), and (−10, 9) should be combined. Further, as shown in FIG. 8, the eighteen images can be combined into one format, so as to form a combined image of all the parallax component images. The combined image has the same size as the ultimate image of the elemental images to be displayed on the display unit. Such a method of combining parallax component images is disclosed in JP-A 2006-98779 (KOKAI). The section obtained by cutting a stack of the same number of combined images as the parallax number as shown in FIG. 7 along a predetermined y-coordinate plane is equivalent to the diagram shown in FIG. 1.

Accordingly, in a conventional case where an alarm image is not displayed, each pixel in the format of the combination of all the images shown in FIG. 8 is converted into a pixel in the ultimate display format (a parallax interleaved image or an elemental image array). However, in a case where the alarm image shown in FIGS. 4 and 5 is to be displayed as in this embodiment, in the one-to-one pixel converting (mapping) operation, the pixels existing in the range of pixels in a non-integral number as the average value from the reference lines $g_3$ and $g_4$ shown in FIG. 1 are not converted, so that the non-converted portions are shown in black. In this manner, an alarm image is automatically formed. In a case where the one-to-one pixel converting operation is performed with the use of maps (conversion tables) showing the pixel correspondences between before and after the conversion, when the operation changes from the regular display operation to the alarm image display operation or vice versa, the maps are simply switched, or the end positions of a map are simply changed. Accordingly, the processing load is not increased by the alarm image display.

Figure 9A:
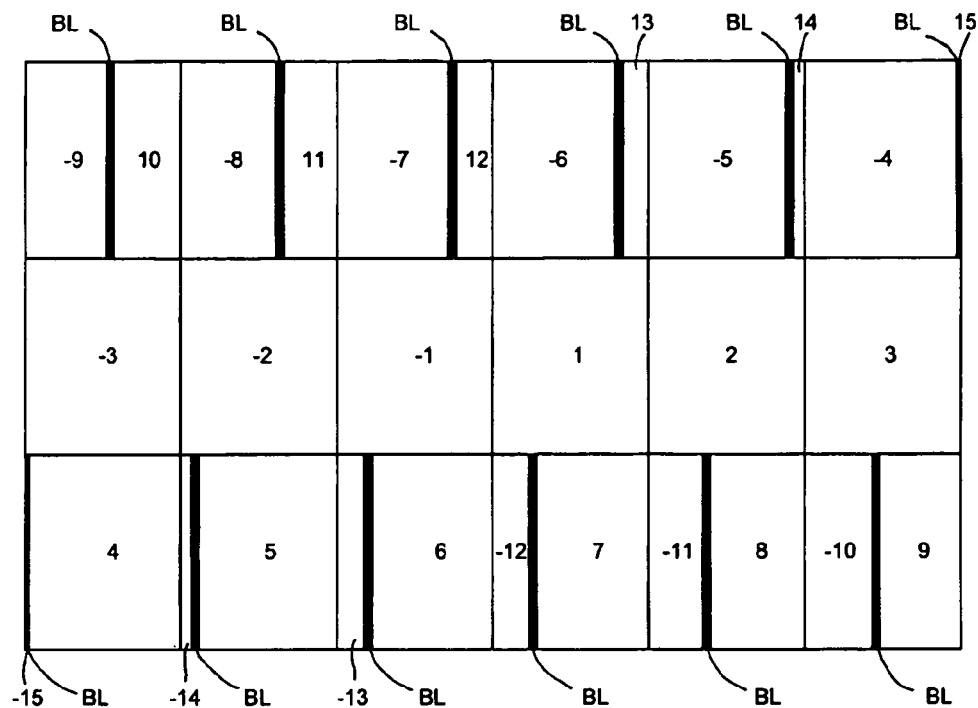
FIGS. 9A and 9B show examples of formats of collectively combined images to be used by a three-dimensional image display device as a comparative example.
Figure 9B:
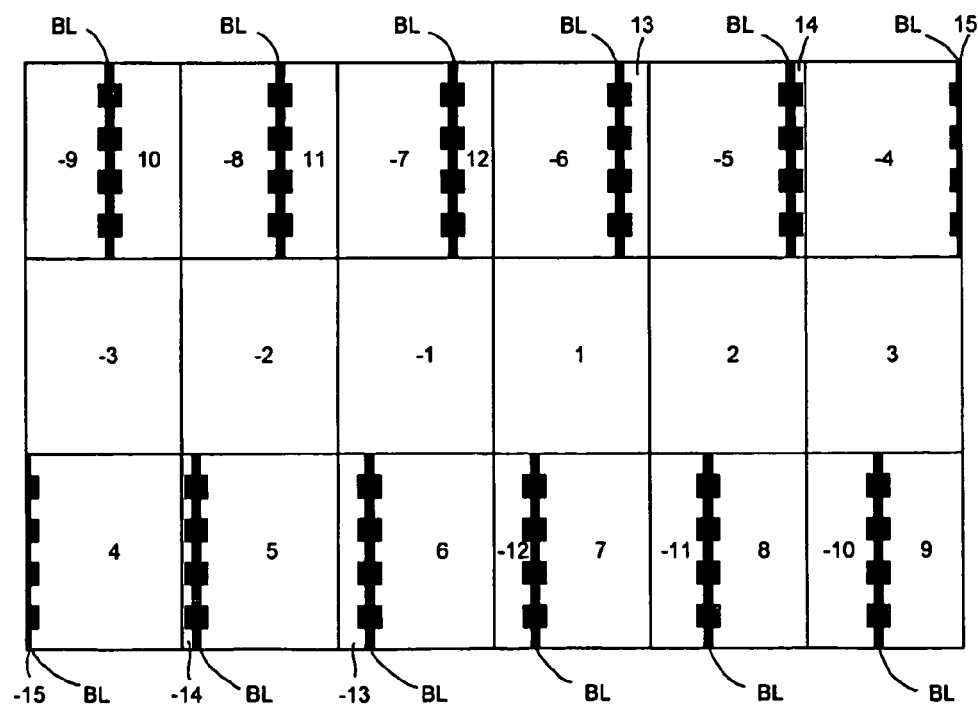

As shown in FIGS. 9A and 9B, black areas BL for an alarm image may be inserted to the format of the collectively combined image shown in FIG. 8, and the same one-to-one converting operation as in the regular operation may be performed so as to display the alarm image. However, if irreversible compression and development are carried out in the situations shown in FIGS. 9A and 9B, a decrease in compression rate and image deterioration are more easily caused than in the situation shown in FIG. 8. Therefore, in the tile-like format, an alarm image is not inserted, but an alarm image is preferably formed by an operation at the time of conversion. The situation shown in FIG. 9A corresponds to the example shown in FIG. 4, and the situation shown in FIG. 9B corresponds to the example shown in FIG. 5.

The optical apertures of the optical plate of the three-dimensional image display of this embodiment may not be vertical, but may have diagonal, zigzag, or step-like shapes. Also, the pixel arrangement on the display device may be a delta arrangement. In any of those cases, the single-color portions of the periodic pattern formed with the widths each equivalent to zero parallax and the widths each equivalent to one parallaxes (the non-integral value being 0.5) or the periodic pattern formed with the widths each equivalent to one parallax and the widths each equivalent to two parallaxes (the non-integral value being 1.5) are used so as to easily display an alarm image, as in the above described embodiment. The single-colored portions may not be in black, but may be in gray, blue, yellow, red, or purple, depending on the contents of the image. Where the parallax number is small, if the contrast between the image and the single-color portions is too sharp, the single-color portions are slightly visible even at the center of the viewing zone. Therefore, gray is often preferred. The color of the single-color portions should preferably be unrecognizable at the center of the viewing zone, regardless of the contents of the image, and should preferably be easily recognized on the viewing boundaries, regardless of the contents of the image.

Referring now to FIGS. 10A through 22, a three-dimensional image display operation utilizing an IP-type parallax image arrangement is described. The three-dimensional image display operation illustrated in FIGS. 10A through 22 is embodied in combination with the display method that has been described with reference to FIGS. 1 through 9B. Here, an example case where the number of parallaxes is 18 is described.

Figure 10A:
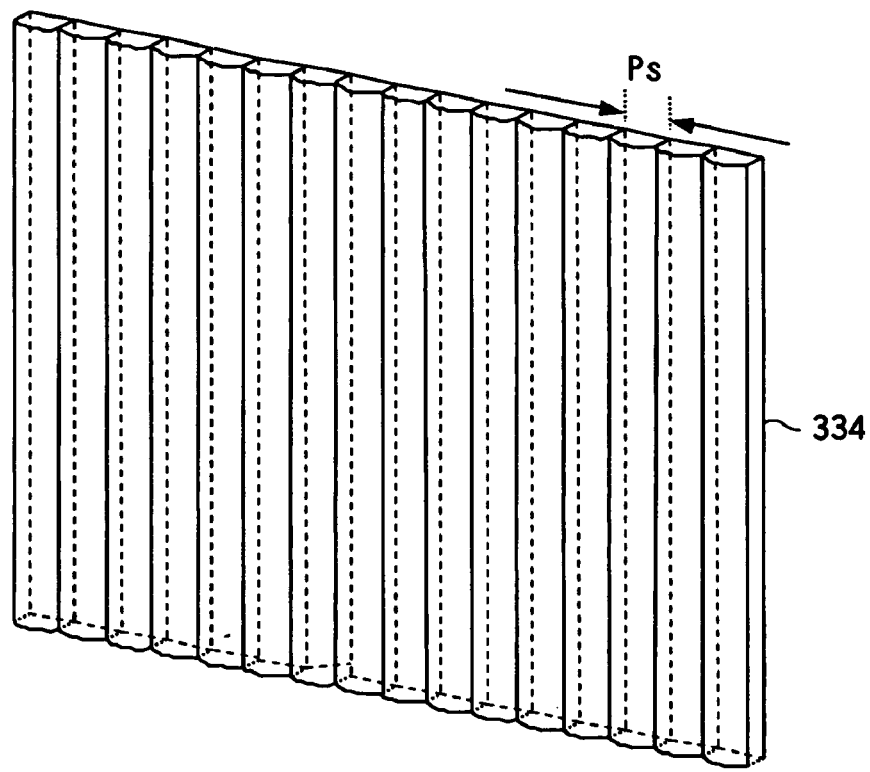
FIGS. 10A and 10B are schematic perspective views of optical plates according to an embodiment.
Figure 10B:
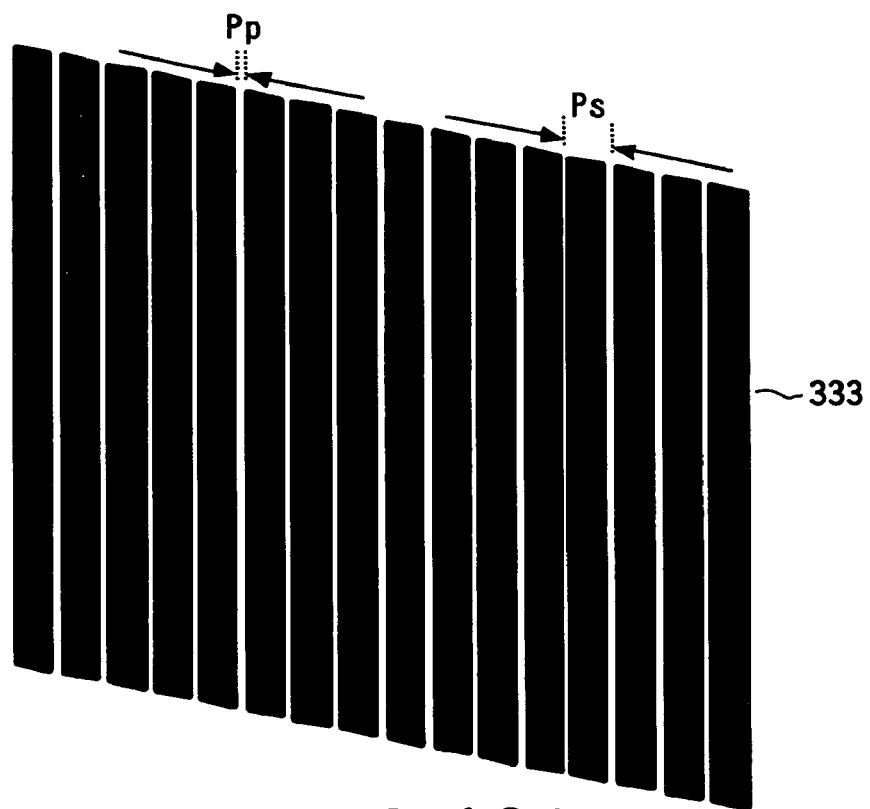

FIG. 10A is a perspective view of a lenticular sheet 334 as an optical plate, and FIG. 10B is a perspective view of a slit array 333 forming an optical plate. In FIGS. 10A and 10B, Ps indicates the parallax barrier pitch, and Pp indicates the pixel pitch of the elemental image display unit.

Figure 11:
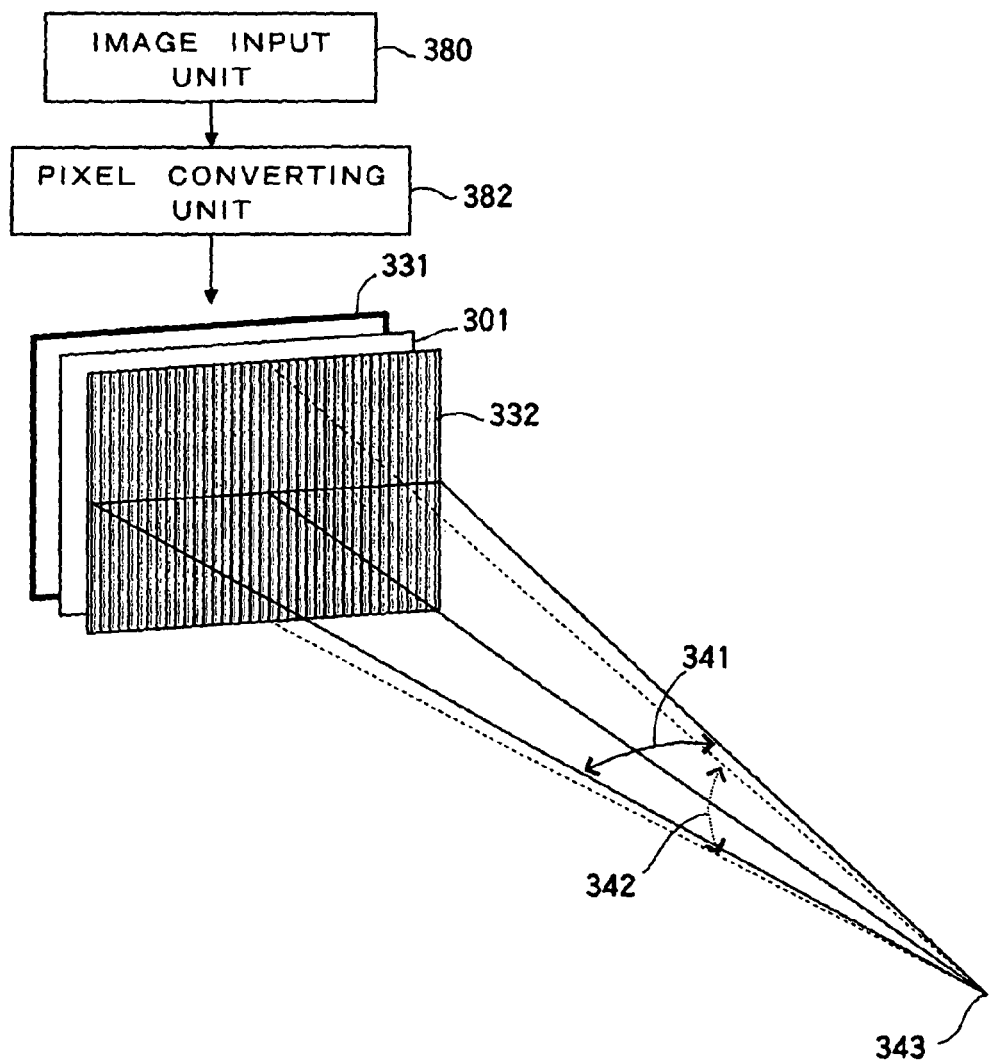
FIG. 11 is a schematic perspective view of a three-dimensional image display device to be used for displaying a three-dimensional image according to an embodiment.

FIG. 11 schematically illustrates the structure of the three-dimensional image display device. In this structure, a diffusion sheet 301 is provided between the elemental image display unit 331 and the lenticular plate (optical control device) 332, if necessary. When seen from a viewpoint 343 at a standard viewing distance, a three-dimensional video image is observed within a range defined by a horizontal viewing angle 341 and a vertical viewing angle 342. However, the parallaxes are limited to the horizontal direction. The three-dimensional image display device also includes an image input unit 380 that inputs an input image shown in FIG. 7 or 8, and a pixel converting unit 382 that performs a pixel converting operation by the method described with reference to FIG. 1.

FIGS. 12(a), 12(b), and 12(c) are development views schematically showing the light-ray reproducing range in a vertical plane and a horizontal plane, with the display unit of the three-dimensional image display device shown in FIG. 11 being the reference point. FIG. 12(a) is a front view of the elemental image display unit 331 and the parallax barrier 332. FIG. 12(b) is a plan view showing an image arrangement by the three-dimensional image display device. FIG. 12(c) is a side view of the three-dimensional image display device. As shown in FIGS. 11 through 12(c), the three-dimensional image display device includes a flat image display unit (the elemental image display unit) 331 such as a liquid crystal display device and the optical plate 332 having optical apertures. As shown in FIGS. 10A and 10B, the optical apertures extending in a straight line in the vertical direction are formed with the lenticular sheet 334 or the slit array 333 arranged at regular intervals in the horizontal direction. In a case of a projection type display unit, the optical apertures are formed with a curved mirror array or the like.

In this three-dimensional image display device, a three-dimensional image can be observed on the front side and the back side of the optical plate 332, as the display device 331 is viewed from the viewing point 343 via the parallax barrier 332 in the range defined by the horizontal viewing angle 341 and the vertical viewing angle 342. Here, the number of pixels of the elemental image display unit 331 is 1920 in the transverse direction (the horizontal direction) and 1200 in the longitudinal direction (the vertical direction) in an example case where one pixel unit is the smallest unit in the square form. Each of the smallest-unit pixels contains sub-pixels of red (R), green (G), and blue (B).

In FIGS. 12(a), 12(b), and 12(c), the viewing distance L between the parallax barrier 332 and the viewing plane 343, the parallax barrier pitch Ps, and the distance d between the parallax barrier 332 and the elemental image display unit 331 (the parallax barrier distance) are defined so as to determine the elemental image pitch Pe based on the intervals at which the aperture centers are projected on the display device from the viewing point in the viewing distance plane 343. Reference numeral 346 indicates the line that connects the viewing point and each aperture center. The viewing zone width W is set so that the elemental images do not overlap with one another on the pixel plane of the display unit 331.

By the one-dimensional IP method, the straight line 346 does not necessarily pass through the center of each sub-pixel on the display face of the display unit 331. By a multi-viewpoint method, on the other hand, the line connecting the viewing point and the center of each aperture passes through the center of each sub-pixel, and is equivalent to the light ray trajectory. In a case where the horizontal pitch Ps of the apertures is an integral multiple of the sub-pixel pitch Pp, the elemental image pitch Pe is an integral multiple of the sub-pixel pitch Pp plus a large fraction. Even if the horizontal pitch Ps of the apertures is not an integral multiple of the sub-pixel pitch Pp, the elemental image pitch Pp is generally an integral multiple of the sub-pixel pitch Pp plus a fraction by the one-dimensional IP method. By the multi-viewpoint method, on the other hand, the elemental image pitch Pe is an integral multiple of the sub-pixel pitch Pp.

Figure 13A:
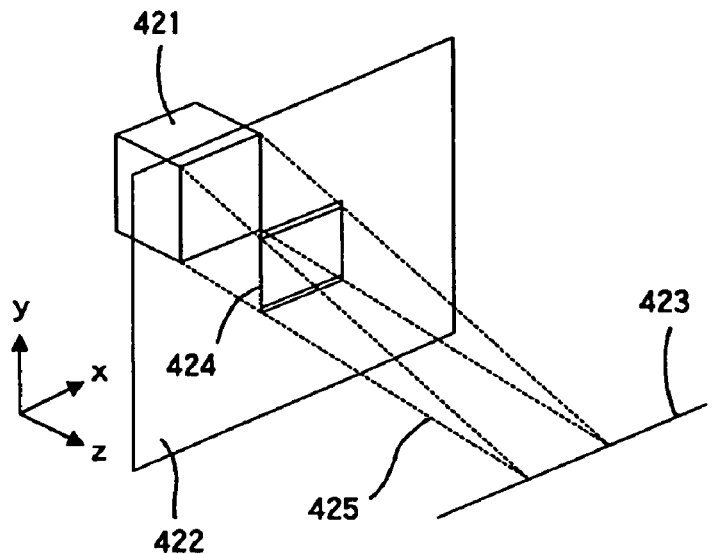
FIGS. 13A and 13B are schematic diagrams each illustrating a method of projecting a parallax component image according to an embodiment.
Figure 13B:
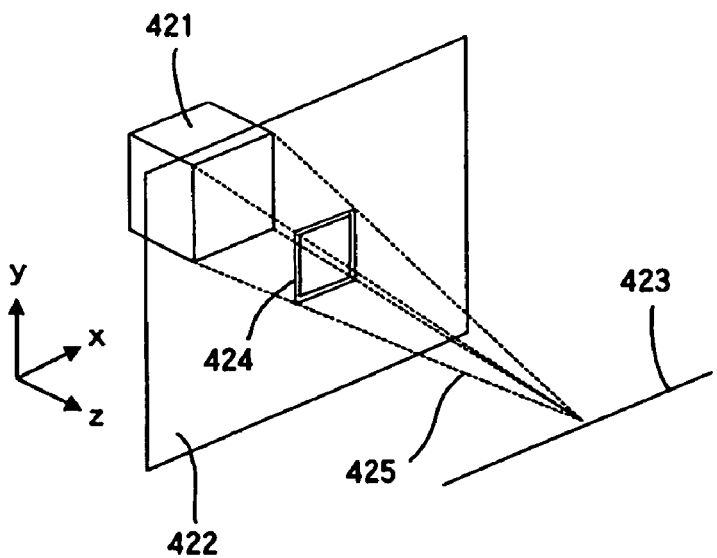

FIGS. 13A and 13B illustrate a method of forming a parallax component image and a three-dimensional image by the one-dimensional IP method in accordance with one embodiment of the present invention. An object 421 to be displayed is projected on a projection face 422 located in the same position as the face on which the optical plate of a three-dimensional image display device is actually placed. To obtain a three-dimensional image without a distortion, the image is projected along projection lines 425 extending toward a projection center line 423 that is parallel to the projection face, is located in front of the projection face (at the center in the vertical direction), and exists in the viewing distance plane, so that perspective projection is performed in the vertical direction while orthographic projection is performed in the horizontal direction, as shown in FIG. 13A. The projection lines 425 cross in the vertical direction on the projection center line 423, but do not cross in the horizontal direction. By this projection method, an image 424 of the object 421 projected on the projection face 422 is formed. In a case where a three-dimensional image is distorted so as to emphasize the stereoscopic effect, the image is projected along projection lines 425 extending to one point (the camera position) on the projection center line 423 that is parallel to the projection face 422, is located in front of the projection face 422 (at the center in the vertical direction), and exists in the viewing distance plane, so that regular perspective projection is performed, as shown in FIG. 13B. By this method, an image 424 of the object 421 perspectively projected on the projection face 422 is formed. In a case where it is highly necessary to restrain distortions in the three-dimensional image but only regular perspective projection can be performed, this projection method should be utilized after a CG model is deformed. Inversely proportional deformation is performed in the z-direction (the depth direction), with a near region, which is a region between a observer and a surface of the optical plate nearest to the observer, in the x-direction being reduced and the far region, which is a region beyond a surface of the optical plate furthest from the observer, in the x-direction being increased.

There need to be several tens of projecting directions in accordance with the viewing distance. In a case where the viewing distance is 1000 mm and the parallel-ray one-dimensional IP method is utilized, the elemental image width is the total width of 18.036 sub-pixels. In this case, the number of cameras is thirty. The projected image (a parallax component image) should be formed only on the columns in the necessary range, which is shown in FIGS. 6 and 14. The projecting directions correspond to the parallax numbers (the camera numbers). The projecting directions are not arranged at regular angles, but are at regular intervals in the viewing distance plane. Accordingly, the cameras are moved in parallel and at regular intervals on the projection center line.

Figure 15:
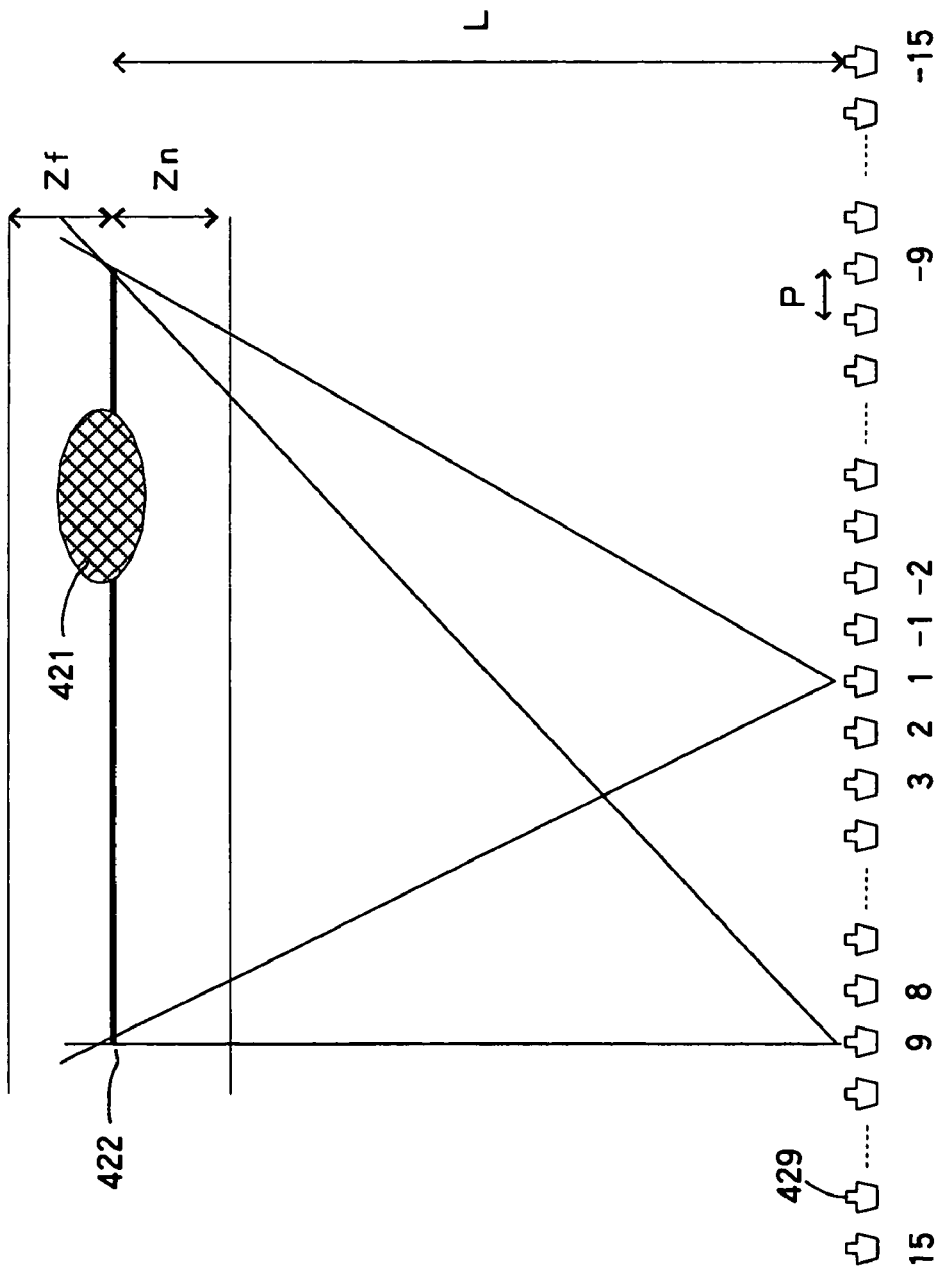
FIG. 15 is a plan view showing the camera arrangement by a three-dimensional image display method according to an embodiment.
Figure 16:
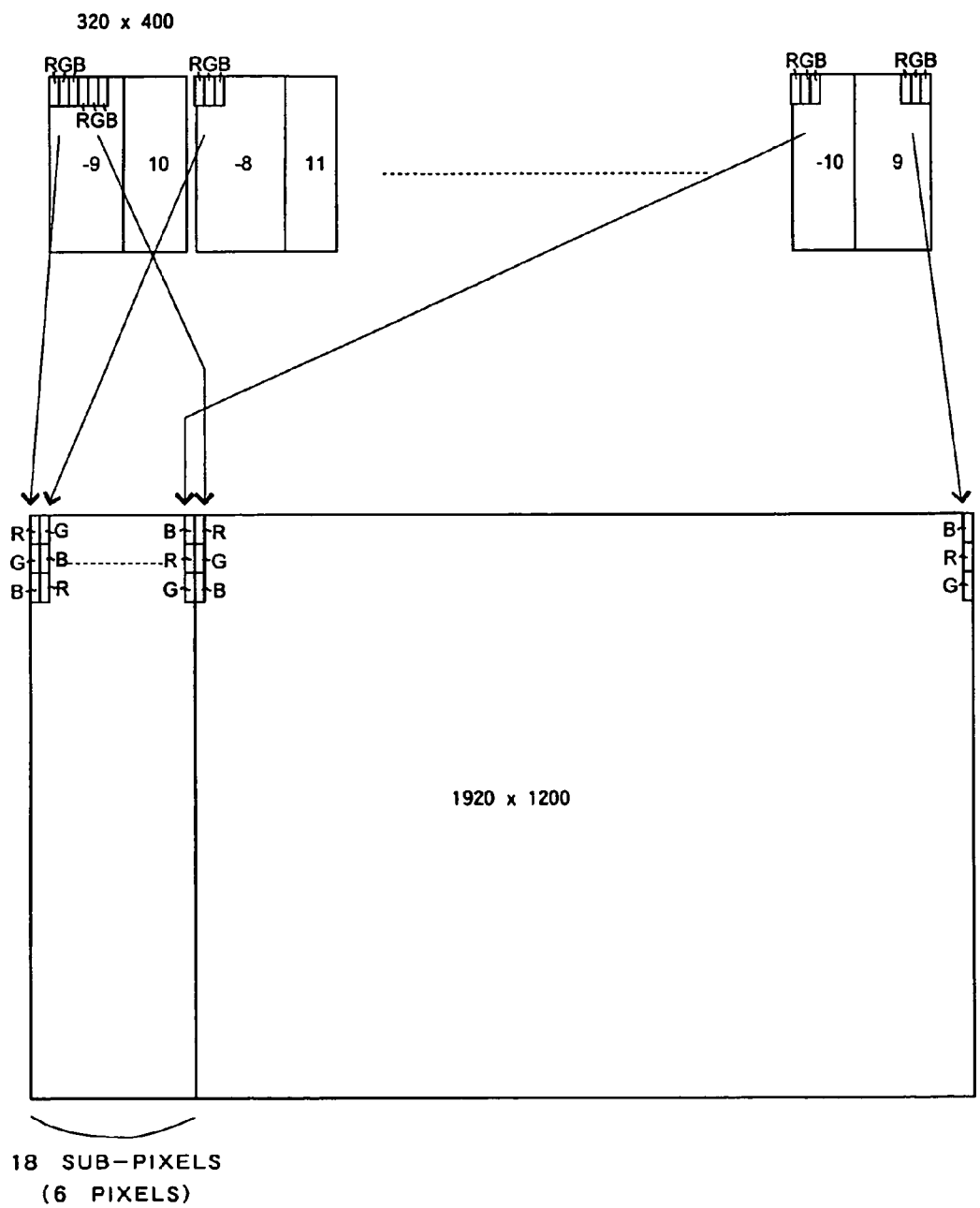
FIG. 16 is a schematic diagram illustrating an image forming method according to an embodiment.

FIG. 15 shows a schematic view of an image formed by a three-dimensional image display method. Cameras 429 arranged at regular intervals in the horizontal direction are controlled so as to pick up images from the projection face 422. Reference numeral 421 indicates the object to be displayed. In FIG. 15, L represents the viewing distance, P indicates the pitch of the cameras 429, Zn indicates the three-dimensional image display range in the near region, and Zf indicates the three-dimensional image display range in the far region. The images (parallax component images) picked up from the respective directions and perspectively projected on the projection face 422 are formed in various regions on the projection face, as shown in FIG. 6. However, the images are combined into the groups of combined images shown in FIG. 7 or the collectively combined image shown in FIG. 8. FIG. 16 shows the method of converting images from this format. The combined image containing the camera image (#–9) at the right end of the viewing zone is placed every eighteen sub-pixels, starting from the first column from the left end toward the right end of a parallax interleaved image. The three sub-pixels in each pixel in the combined image are shuffled in the vertical direction. The combined image that contains the camera image (#–8) and is the second combined image from the right end of the viewing zone is placed every eighteen sub-pixels, starting from the second column from the left end toward the right end of the parallax interleaved image. The three sub-pixels in each pixel in the combined image are shuffled in the vertical direction. This operation is repeated. Lastly, the combined image containing the camera image (#9) at the left end of the viewing zone is placed every eighteen sub-pixels, starting from the eighteenth column from the left end toward the right end of the parallax interleaved image. The three sub-pixels in each pixel in the combined image are shuffled in the vertical direction. Through the one-to-one converting operation, the parallax interleaved image is completed on the elemental image display face.

Figure 17:
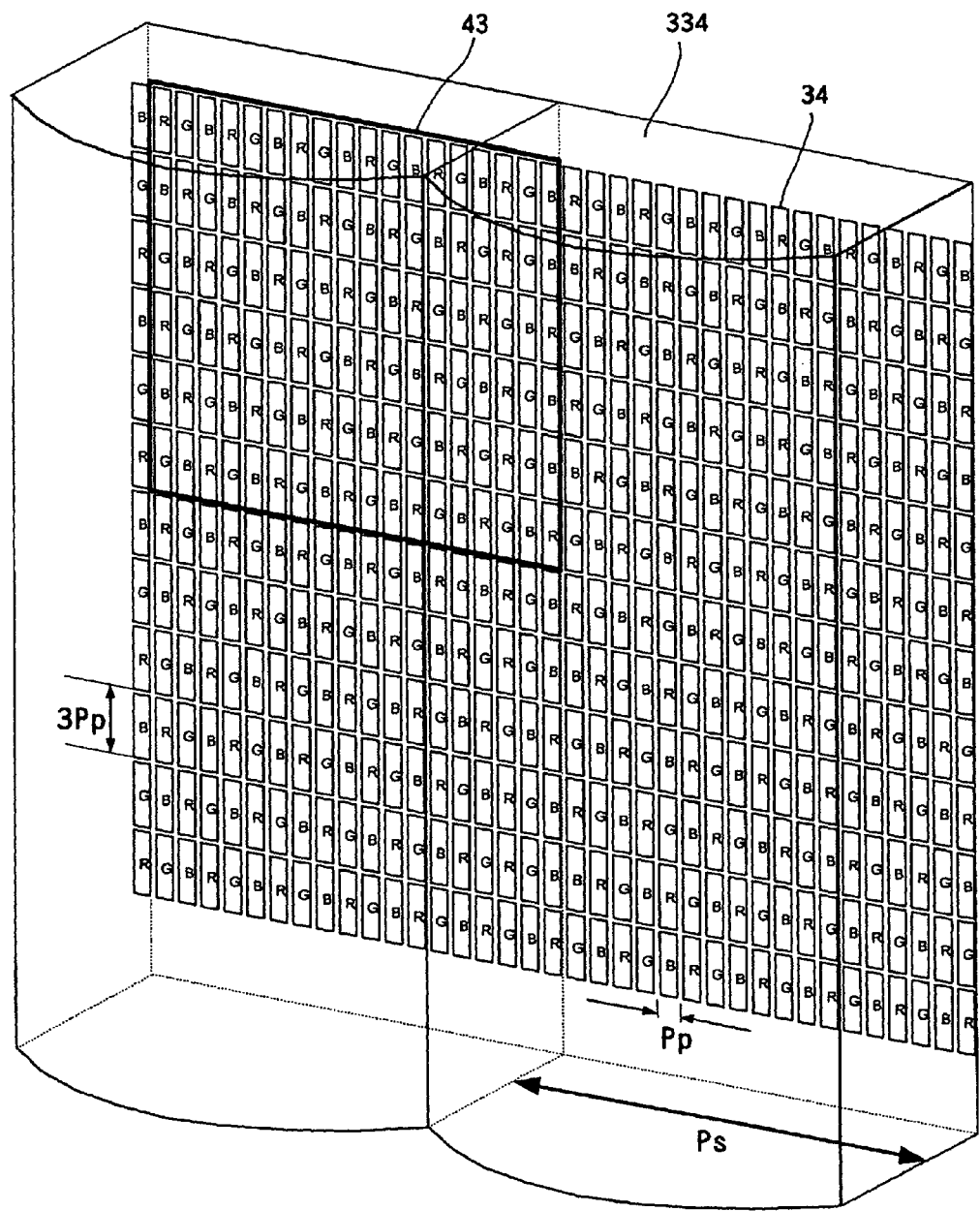
FIG. 17 is a schematic perspective view showing the pixel arrangement by the elemental image display unit according to an embodiment.

FIG. 17 schematically shows a part of the structure of the three-dimensional image display device of this embodiment. The lenticular sheet 334 formed with cylindrical lenses having optical apertures extending in the vertical direction is provided as the optical plate on the front face of the display face of the flat elemental image display unit such as a liquid crystal panel. The optical apertures may have diagonal shapes or step-like shapes. On the display face, sub-pixels 34 having the aspect ratio of 3:1 are arranged in a matrix fashion. Here, the sub-pixels 34 are aligned along straight lines in the horizontal direction and along straight lines in the vertical direction. Also, the sub-pixels 34 are arranged so that red pixels, green pixels, and blue pixels appear in cycles in the horizontal direction on the same row and the same column. The color arrangement is generally known as a mosaic arrangement.

Figure 18:
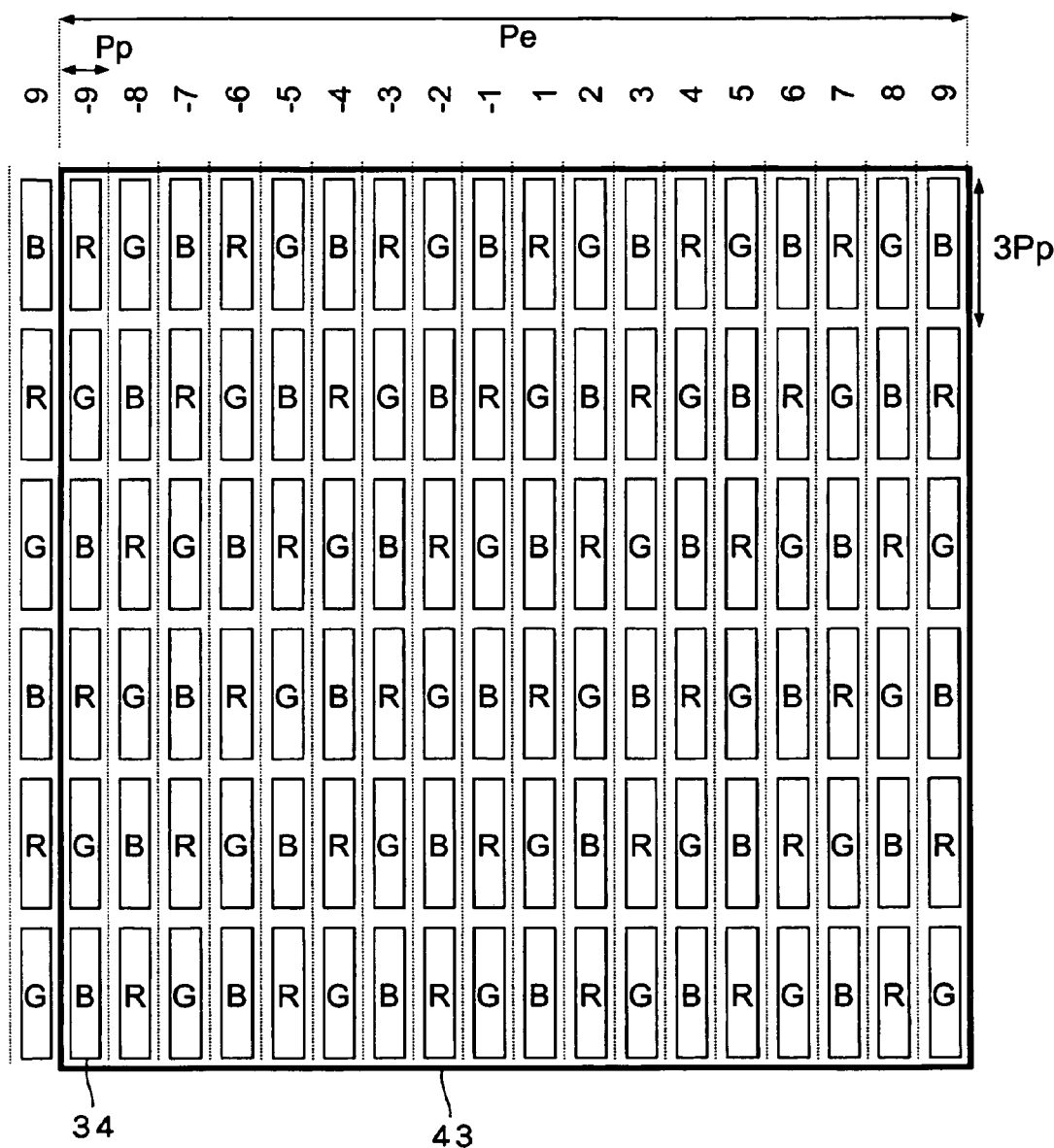
FIG. 18 is a schematic front view showing the pixel arrangement and the parallax image arrangement by the elemental image display unit according to embodiment.

FIG. 18 shows an example plan view of a pixel arrangement. The numbers "–9" through "9" are the parallax numbers, and each two neighboring parallax numbers are allotted to two neighboring columns. The number of cycles of sub-pixels in each row is three times larger than the number of cycles of sub-pixels in each column. On the display screen shown in FIG. 18, the sub-pixels 34 arranged in eighteen columns and six rows constitute one effective pixel 43 (this effective pixel 43 is indicated by a bold-line frame in FIG. 17), or the sub-pixels 34 arranged in eighteen columns and three rows constitute one effective pixel. With the display unit having this structure, a three-dimensional image having eighteen parallaxes in the horizontal direction can be displayed. In a case where this display structure is employed in a multi-viewpoint structure, the number of viewpoints is eighteen, the elemental image pitch is equivalent to eighteen sub-pixels, and the horizontal pitch of the optical plate is smaller than eighteen sub-pixels.

Figure 19:
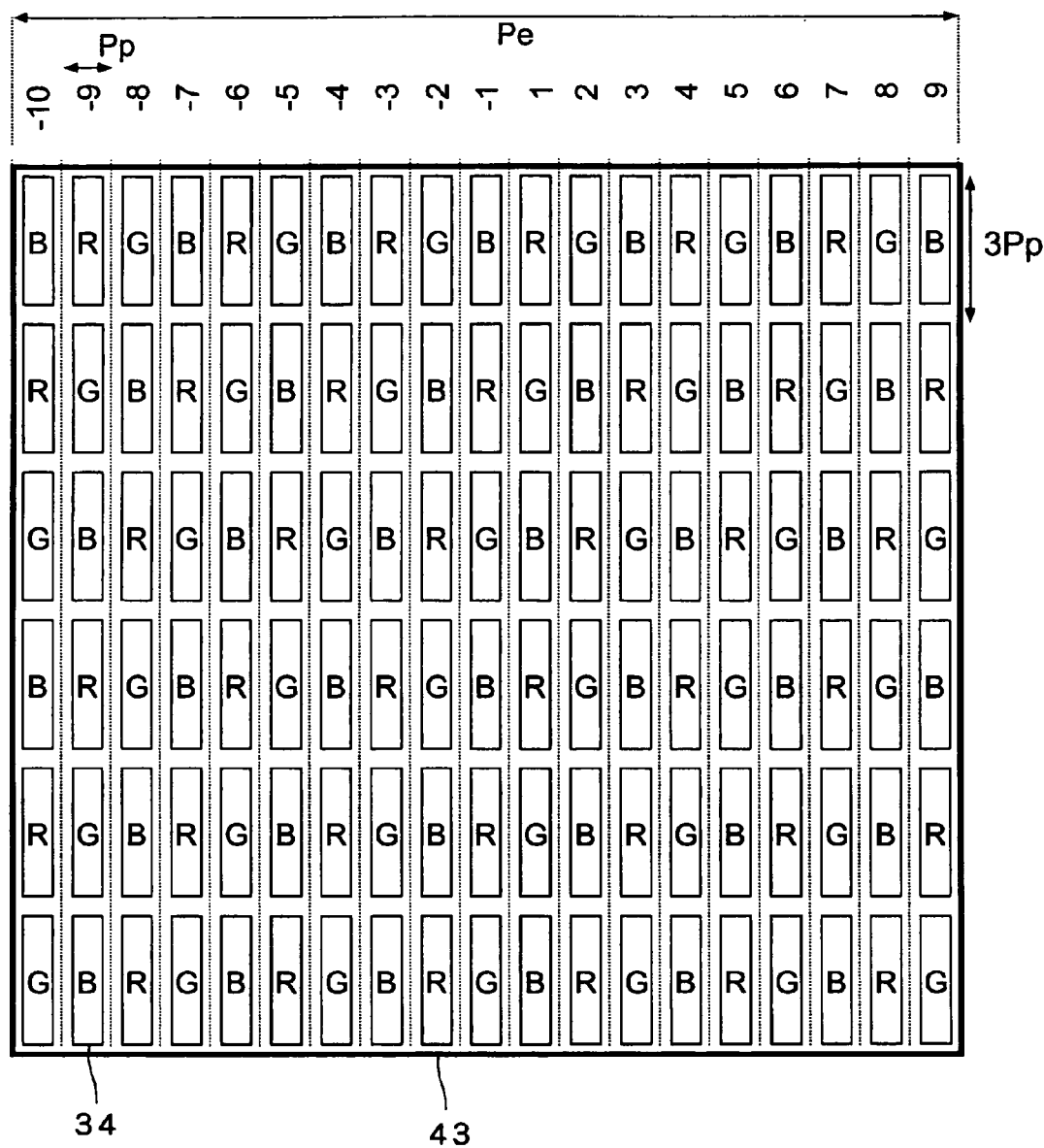
FIG. 19 is a schematic front view showing the pixel arrangement and the parallax image arrangement by the elemental image display unit according to an embodiment.

In a case of an IP type, elemental image boundaries are formed at a slightly larger interval than the total width of eighteen sub-pixels (18.036, for example) in such a structure that the parallax barrier pitch Ps is equivalent to eighteen sub-pixels and combinations of parallel rays are formed. Accordingly, the width of an effective pixel is equivalent to eighteen columns or nineteen columns, depending on its location in the display plane. More specifically, the average value of the elemental image pitch is larger than the total width of eighteen sub-pixels, and the horizontal pitch of the optical plate is equivalent to the total width of eighteen sub-pixels. FIG. 19 shows an example case where the width of an effective pixel is equivalent to the total width of nineteen columns.

Figure 20:
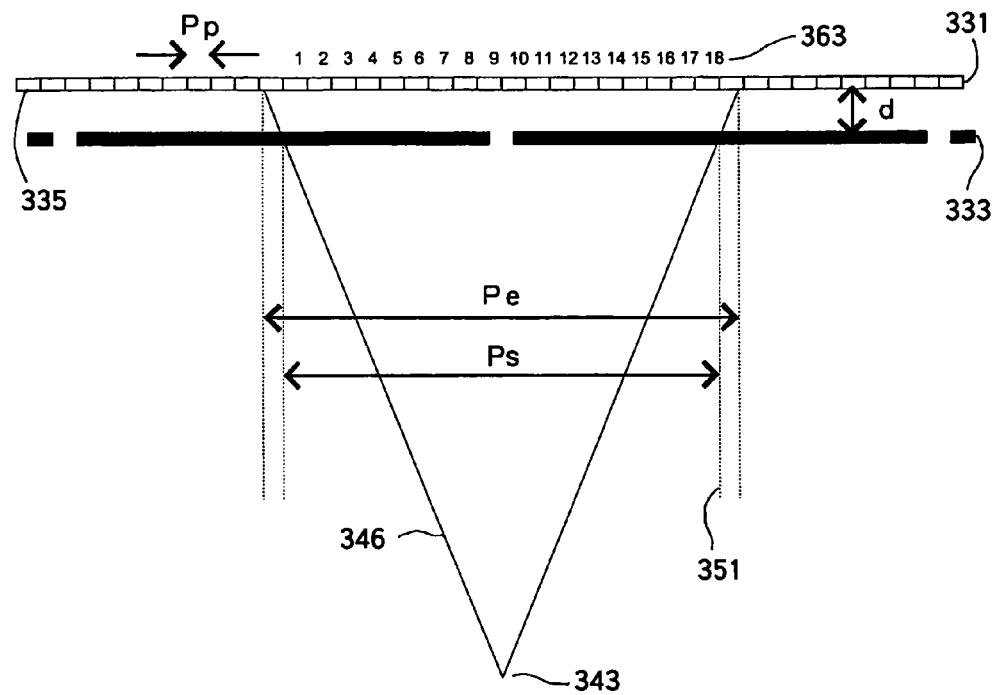
FIG. 20 is a schematic diagram showing the positional relationship among the pixels, the element images, and the parallax barrier by a method according to an embodiment.
Figure 21:
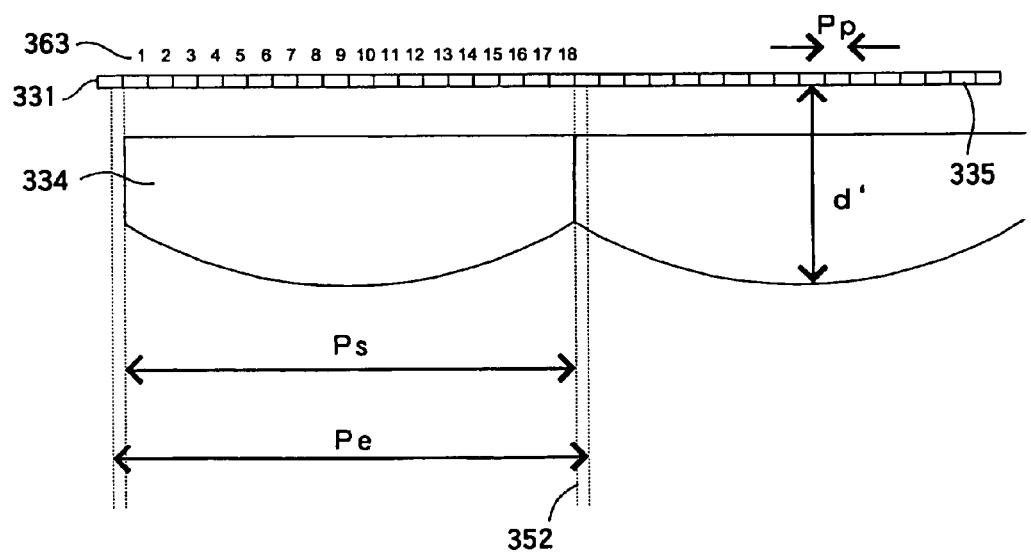
FIG. 21 is a schematic diagram showing the positional relationship among the pixels, the elemental images, and the lenticular plate by a method according to an embodiment.

FIGS. 20 and 21 are schematic horizontal cross-sectional views of the display unit of a three-dimensional image display device. As shown in FIGS. 20 and 21, the horizontal-direction pitch Ps (interval) of the slits 333 or the lenticular lenses of the lenticular sheet 334 is set to the same value as the total width of an integral number of sub-pixels. More specifically, central axes 351 extending through the centers between the slits 332 and reference axes 352 extending through the boundaries between the lenticular lenses pass through the boundaries between the sub-pixels. An integral number of sub-pixels 335 are provided in the region between the central axes 351 and the region between the reference axes 352, and the horizontal-direction pitch Ps (interval) of the central axes 351 and the reference axes 352 is fixed to a constant value. In the examples shown in FIGS. 20 and 21, the pitch Ps is set to the same value as the total width of eighteen sub-pixels. The parallax barrier distance d between the display face (pixel plane) 331 of the elemental image display unit and the parallax barriers 332 and 334 is effectively set to approximately 2 mm, with the refractive indexes of the glass substrate and the lens material being taken into consideration. In FIGS. 20 and 21, reference numeral 343 indicates the viewing distance plane, and reference numeral 363 indicates the numbers allotted to parallax component images.

Figure 22:
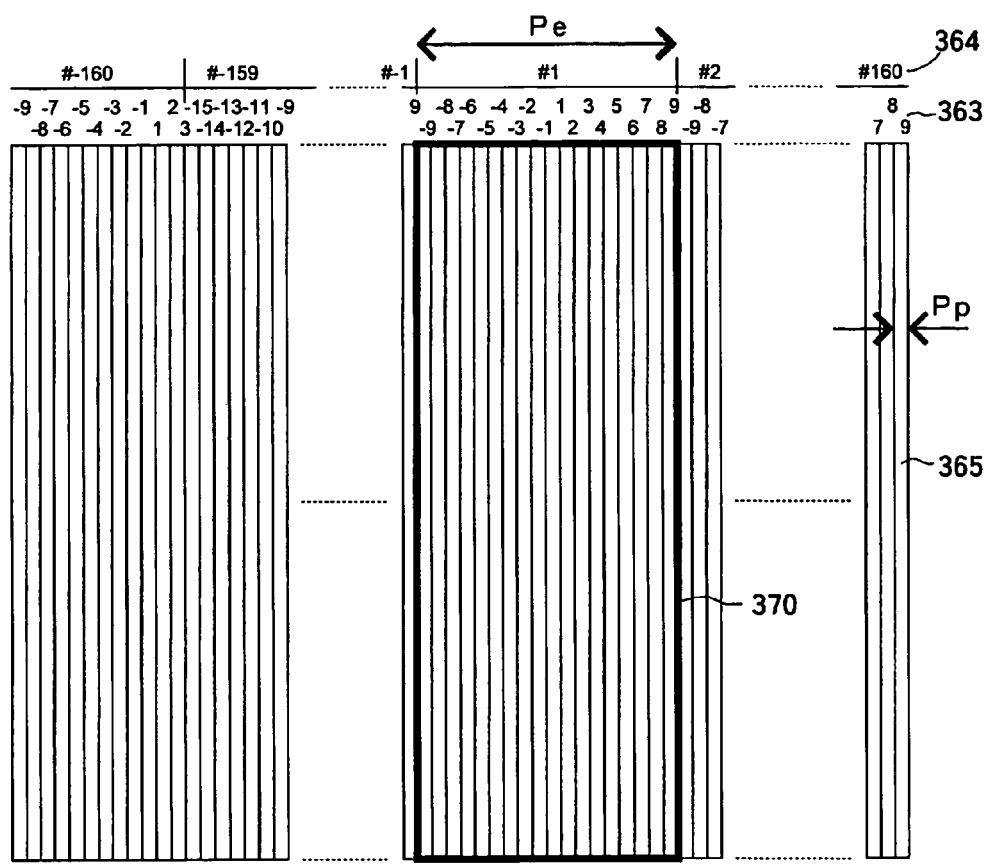
FIG. 22 is a schematic diagram showing an image arranging method to be utilized by the elemental image display unit according to an embodiment.

FIG. 22 is a conceptual diagram of the elemental image display unit of a three-dimensional image display device of an IP type in accordance with an embodiment of the present invention.

FIG. 22 shows a front view of the display unit for explaining a method of arranging images in the display plane of the elemental image display unit. The display plane of the elemental image display unit is divided into elemental images 370 corresponding to the respective apertures (the opening portions of the optical plate). Each one elemental image 370 is formed with eighteen or nineteen sub-pixel columns 365 in accordance with the IP method. The total number of sub-pixel columns to which parallaxes can be allotted is 5760, and the number of apertures is 320 (in FIG. 22, the zone 364 showing the aperture numbers includes the range of #−160 to #−1 and the range of #1 to #160). The aperture pitch Ps is equivalent to the total width of eighteen sub-pixels. In FIG. 22, the sub-pixel columns 365 are provided with a region 363 showing the corresponding parallax numbers (in this example case, the thirty directions of the parallax numbers −15 through −1 and the parallax numbers of 1 through 15 are shown). The elemental image 370 of the aperture number #1 is formed with eighteen parallax columns of the parallax numbers −9 through −1 and the parallax numbers 1 through 9. The elemental image of the aperture number #−159 is formed with eighteen parallax columns of the parallax numbers −15 through −1 and the parallax numbers 1 through 3. Since the width of each elemental image 370 is slightly larger than the total width of eighteen sub-pixels, the boundary between each two elemental images 370 is adjusted to the closest sub-pixel column boundary (a conventional A-D conversion method). In this case, the number of sub-pixel columns with respect to an aperture is eighteen for most of the apertures. However, some of the apertures have nineteen sub-pixel columns (see FIGS. 18 and 19). Beyond each aperture having nineteen sub-pixel columns, the parallax numbers in each aperture are shifted by one. The numbers allotted to the apertures having nineteen sub-pixel columns are #14, #42, #70, #98, #125, and #153 (plus the negative numbers of those numbers) (in a case where the viewing distance is 1000 mm).

In FIG. 14, the lens numbers at which the placement of parallax images in the respective directions is started and ended (the 3-D pixel numbers in the table) are shown. In this table, the corresponding sub-pixel column numbers of the elemental image display unit (a liquid crystal panel) are also shown.

As described above, in accordance with the present invention, generation of broken images can be readily restrained (an alarm image with high visibility can be readily displayed), without an increase in processing load and a decrease of the viewing zone.

It should be noted that the present invention is not limited to the above embodiments, but modifications may be made to the components of those embodiments, without departing from the scope of the invention.

Also, the components disclosed in the above embodiments may be combined to form various other embodiments. For example, some of the components disclosed in the above embodiments may be eliminated, or the components of different embodiments may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

The invention claimed is:

1. A three-dimensional image display device comprising:
    an elemental image display unit that has pixels arranged in a matrix form in a display plane, and displays elemental images each including a plurality of parallax component images;
    an optical plate that is placed to face the elemental image display unit, has optical apertures that extend linearly in a vertical direction and are arranged at regular intervals in a horizontal direction, and controls light rays from the elemental image display unit, each optical aperture being associated with each elemental image; and
    an image data converting unit that converts image data so that single-color portions having periodically varying widths are inserted to boundary portions between the elemental images, the width varying with locations in the elemental image display unit, inserted the single-color portions being asymmetrical in the entire elemental image display unit.

2. The device according to claim 1, wherein the image data converting unit converts a multi-viewpoint image not having single-color portions inserted thereto into a display format of the elemental image display unit by performing a selective converting operation in which some pixels are not converted.

3. The device according to claim 1, wherein the image data converting unit converts a format having multi-viewpoint images arranged in a tile-like fashion into a display format of the elemental image display unit by performing a selective converting operation in which some pixels are not converted, each of the multi-viewpoint images not having single-color portions inserted thereto.

4. The device according to claim 1, wherein the single-color portions are in black.

5. The device according to claim 1, wherein the single-color portions form at least one of a periodic pattern having widths each equivalent to zero parallax and widths each equivalent to one parallax and a periodic pattern having widths each equivalent to one parallax and widths each equivalent to two parallaxes in a horizontal direction of the elemental image display unit.

6. The device according to claim 1, wherein the single-color portions form a periodic pattern in which a first horizontal periodic pattern and a second horizontal periodic pattern alternately appear in a vertical direction of the elemental image display unit.

7. A three-dimensional image display method by which a three-dimensional image is displayed with the use of a three-dimensional image display device that includes: an elemental image display unit that has pixels arranged in a matrix fashion in a display plane, and displays elemental images each including a plurality of parallax component images; and an optical plate that is placed to face the elemental image display unit, has optical apertures that extend linearly in a vertical direction and are arranged at regular intervals in a horizontal direction, and controls light rays from the elemental image display unit, each optical aperture being associated with each elemental image;
    the method comprising converting image data so that single-color portions having periodically varying widths are inserted to boundary portions between the elemental images, the width varying with locations in the elemental image display unit, inserted the single-color portions being asymmetrical in the entire elemental image display unit.

8. The method according to claim 7, wherein the converting image data includes converting a multi-viewpoint image not having single-color portions inserted thereto into a display format of the elemental image display unit by performing a selective converting operation in which some pixels are not converted.

9. The method according to claim 7, wherein the converting image data includes converting a format having multi-viewpoint images arranged in a tile-like fashion into a display format of the elemental image display unit by performing a selective converting operation in which some pixels are not converted, each of the multi-viewpoint images not having single-color portions inserted thereto.

10. The method according to claim 7, wherein the single-color portions are in black.

11. The method according to claim 7, wherein the single-color portions form at least one of a periodic pattern having widths each equivalent to zero parallax and widths each equivalent to one parallax and a periodic pattern having widths each equivalent to one parallax and widths each equivalent to two parallaxes in a horizontal direction of the elemental image display unit.

12. The method according to claim 7, wherein the single-color portions form a periodic pattern in which a first horizontal periodic pattern and a second horizontal periodic pattern alternately appear in a vertical direction of the elemental image display unit.

* * * * *